United States Patent [19]

Miyazaki

[11] Patent Number: 5,703,455
[45] Date of Patent: Dec. 30, 1997

[54] CONTROL DEVICE FOR A STEPPING MOTOR INCLUDED IN AN ELECTRONIC APPARATUS

[75] Inventor: Hideto Miyazaki, Yokohama, Japan

[73] Assignee: Ricoh Company, Ltd., Tokyo, Japan

[21] Appl. No.: 707,073

[22] Filed: Sep. 3, 1996

[30] Foreign Application Priority Data

Sep. 5, 1995 [JP] Japan .................................. 7-227956

[51] Int. Cl.$^6$ .................................................. H02P 8/00
[52] U.S. Cl. .......................... 318/685; 318/701; 318/270
[58] Field of Search ................................. 318/254, 268, 318/269, 270, 685, 696, 701

[56] References Cited

U.S. PATENT DOCUMENTS 4,862,284  8/1989  Murata ........................ 358/451
5,248,027  9/1993  Kluger et al. ................. 198/502.4
5,446,355  8/1995  Janosky et al. ............... 318/661

Primary Examiner—Bentsu Ro
Attorney, Agent, or Firm—Oblon, Spivak, McClelland, Maier & Neustadt, P.C.

[57] ABSTRACT

A control device for controlling the drive of a stepping motor included in an electronic apparatus as a drive source is disclosed. The stepping motor is totally controlled by a microprocessor and driven by a motor driver. A memory stores control data for the acceleration, constant-speed drive and deceleration of the motor. A motor controller controls the motor via the motor driver with the control data loaded without the intermediary of the microprocessor. A constant-speed rotation end signal is input to the motor controller from either a CPU (Central Processing Unit) or an external unit as a repeat signal. When the repeat signal is "0", the control data stored in the memory and assigned to constant-speed drive is repeatedly loaded a preselected number or times, causing the motor to rotate at a constant speed. When the repeat signal is "1", the above control data is repeatedly loaded until the repeat signal changes to "0".

6 Claims, 20 Drawing Sheets

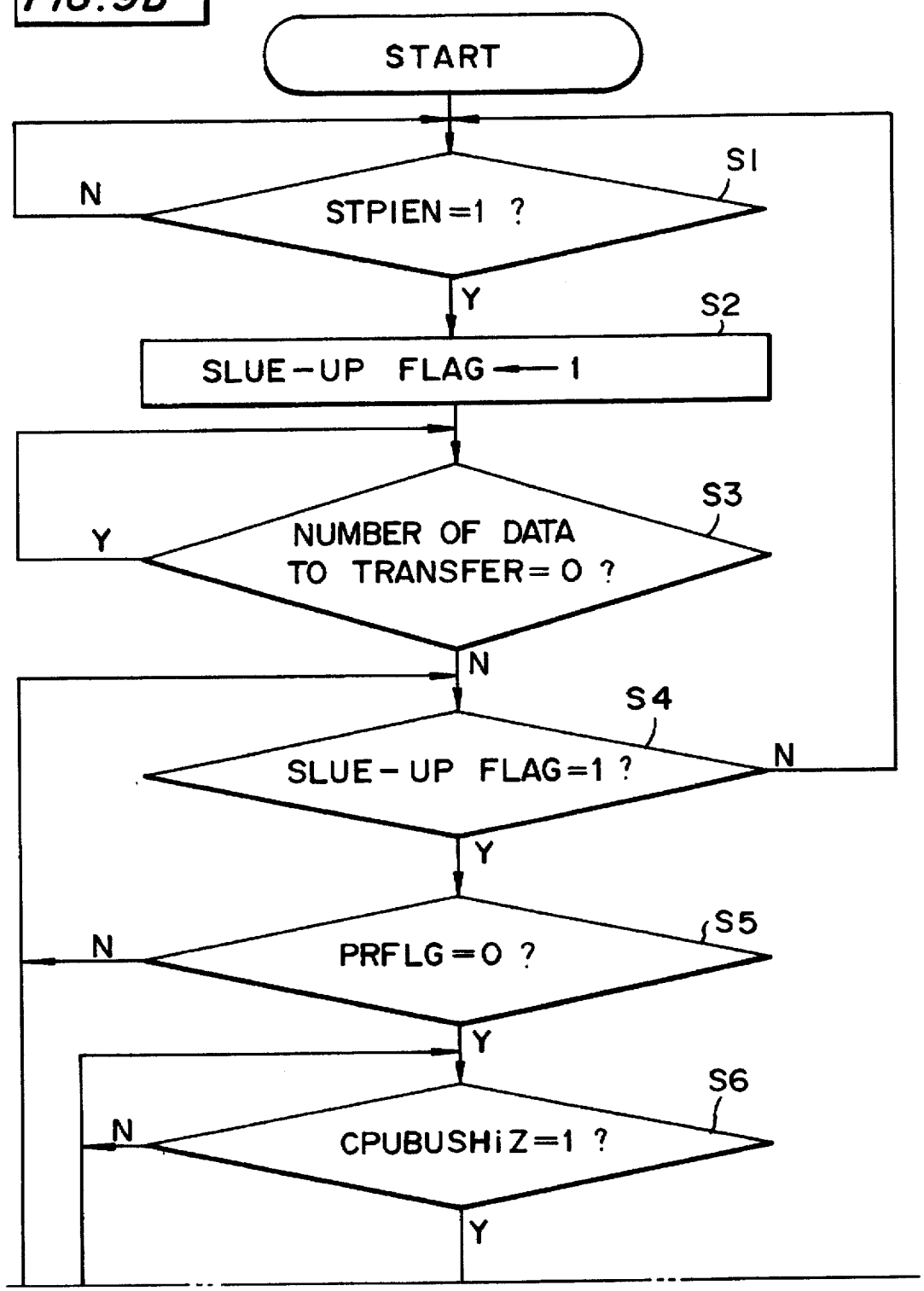

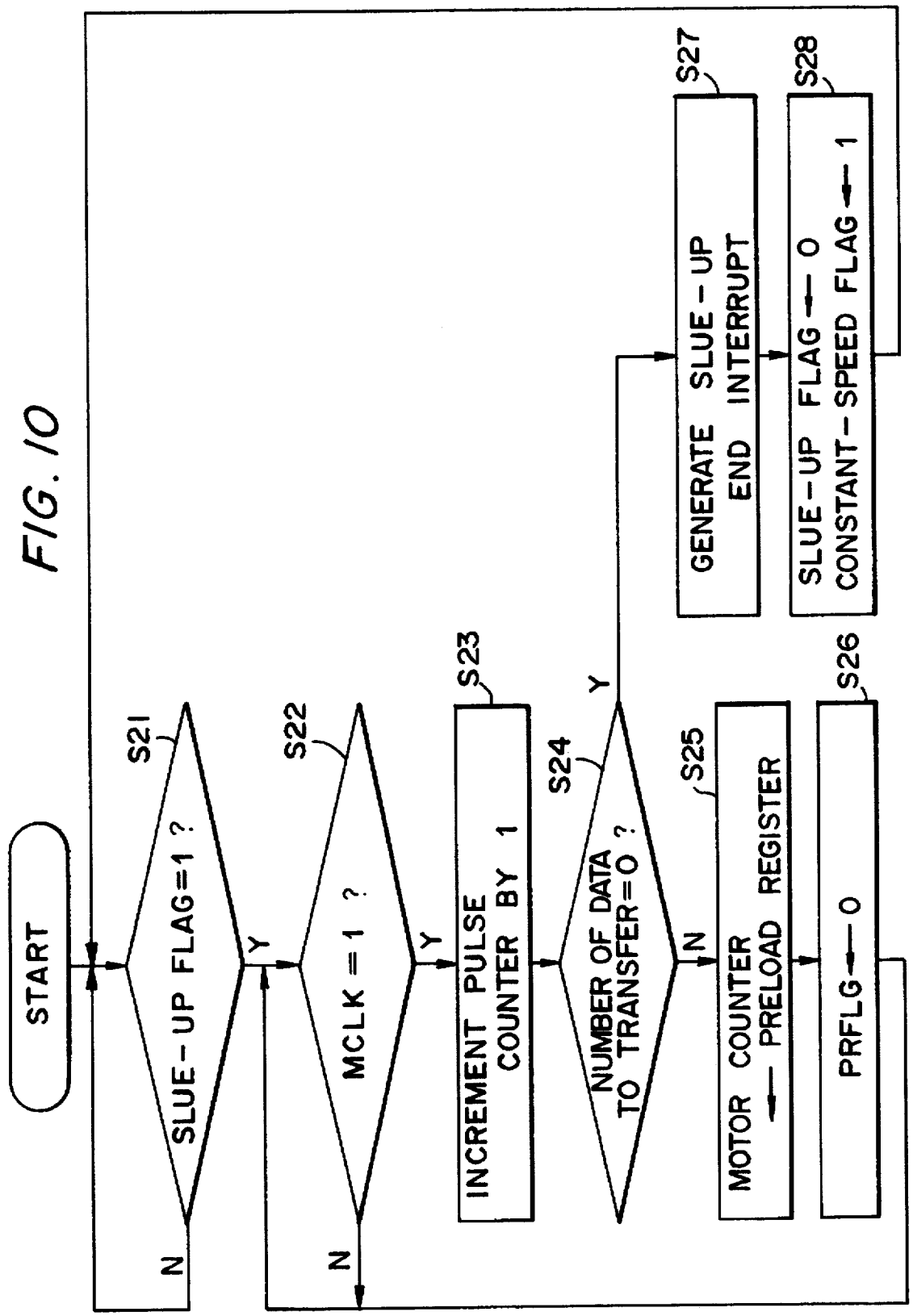

| FIG.12A |
| FIG.12B |

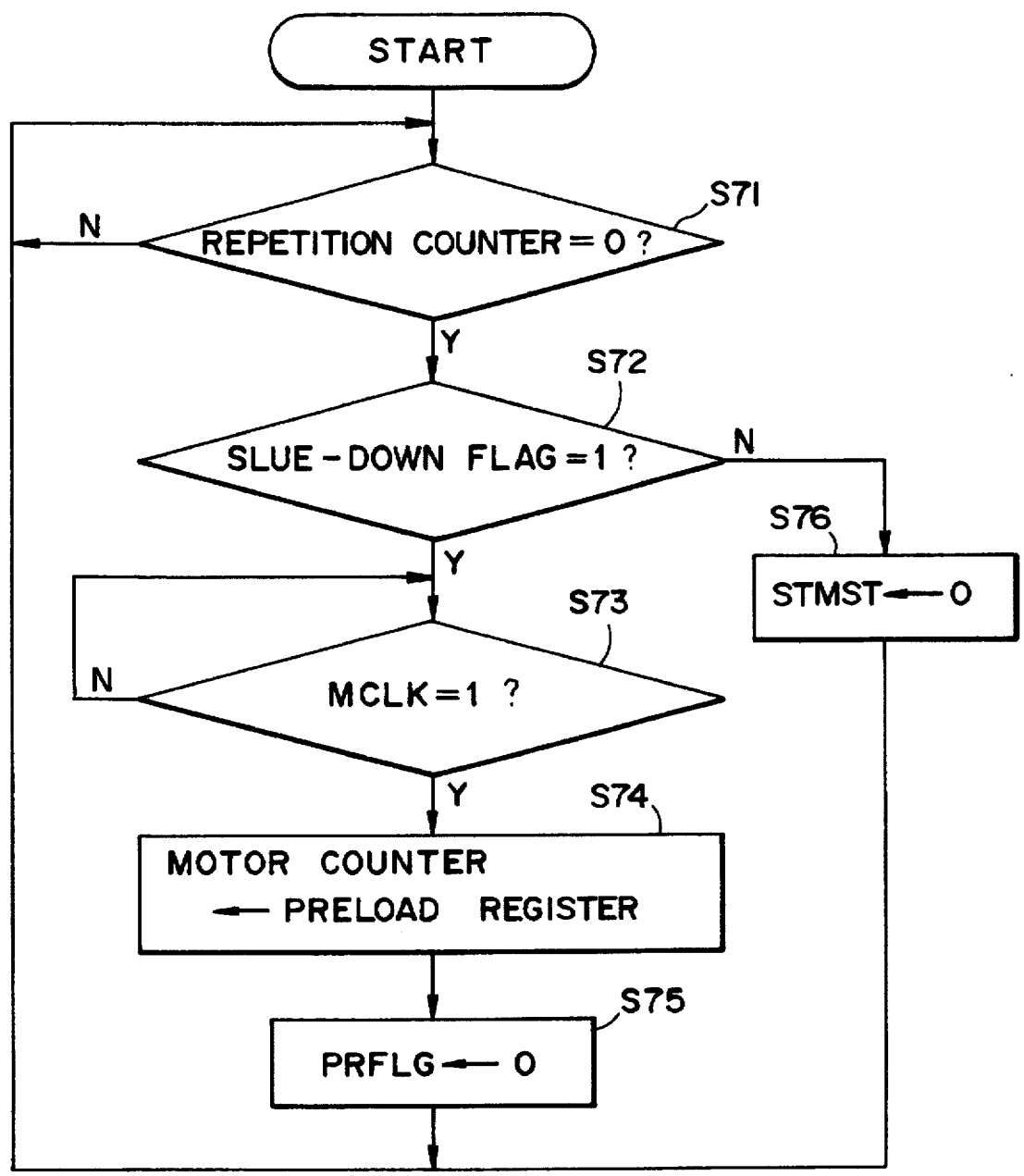

CONTROL DEVICE FOR A STEPPING MOTOR INCLUDED IN AN ELECTRONIC APPARATUS

BACKGROUND OF THE INVENTION

The present invention relates to a device for controlling the drive of a stepping motor included in an electronic apparatus as a drive source and, more particularly, to a control device for a stepping motor included in an image forming apparatus.

A digital copier, for example, has a scanner section including a carriage or movable portion carrying mirrors, light source and so forth thereon. The scanner section also includes a glass platen. When the operator of the copier sets a document on the glass platen and then presses a copy start key, the carriage is moved by a drive source in the horizontal direction while scanning the document optically. The resulting imagewise reflection from the document is routed through the above mirrors, other mirrors and a lens to a CCD (Charge Coupled Device) color image sensor. In response, the image sensor generates image data representative of the document. A printer section prints out the image data on a paper while controlling a semiconductor laser, a drive source for driving conveyor rollers, and so forth.

Generally, the drive source for driving the carriage and the drive source for driving the conveyor rollers are implemented by stepping motors. To rotate a stepping motor, phase drive signals synchronous to drive pulses are input to motor drive means, as well known in the art. Slue-up control and slue-down control are essential for the stepping motor to rotate at frequency higher than its self-start frequency. Such control over the stepping motor has customarily been assigned to a microprocessor which controls the entire copier. This, however, increases the load on the microprocessor. Particularly, when the microprocessor executes the motor control in parallel with another kind of control, the frequency of the pulses for driving the motor cannot be increased above a certain limit, limiting the processing speed available with the copier.

In light of the above, Japanese Patent Laid-Open Publication No. 63-212580, for example, proposes a motor control device for a printer and including motor control means. A microprocessor installed in the printer is in charges of the slue-up and slue-down control over a stepping motor while the motor control means is in charge of constant-speed control. This, however, does not reduce the load on the microprocessor during slue-up and slue-down control, particularly in the vicinity of a constant-speed region, although reducing it during constant-speed control. As a result, the rotation speed of the motor cannot be increased to a desirable degree.

Pending U.S. Ser. No. 08/582,421, filed Jan. 3, 1996, teaches an arrangement for implementing high-speed and accurate drive of a stepping motor while reducing the load on a microprocessor throughout acceleration, constant-speed drive, and deceleration. The arrangement includes control means capable of controlling the motor via motor drive means with control data loaded from store means without the intermediary of a microprocessor. The control data are respectively assigned to the acceleration, constant-speed drive and deceleration of the motor. However, this kind of control scheme is effective only when the motor is used to drive a scanner or carriage whose maximum distance of movement is definite. The above scheme is not effective when it comes to a stepping motor for driving paper conveyor rollers.

Specifically, when a plurality of papers are continuously conveyed in a repeat copy mode, the above stepping motor must be accurately controlled, as follows. First, the motor is accelerated on the basis of the control data assigned to acceleration. Then, the motor is driven at a constant speed with the control data assigned to constant-speed drive being repeatedly used a number of times corresponding to the number of papers. After the last paper or copy has been driven out of the copier to a tray by way of an image forming section, the motor is decelerated on the basis of the control data assigned to deceleration and then brought to a stop.

In the above control, how many times the constant-speed control data has been repeatedly used must be counted by a counter. However, it is difficult to define the upper limit of the number of times that the above control data is used during the constant-speed drive of the motor. It follows that preparing a counter capable of surely counting such occurrences is not practical. Although some suitable counter may be prepared, the number of images which can be continuously produced is limited by the counting ability of the counter.

In a laser printer or similar page printer, a printer controller, for example, transforms text code data received from a host computer to graphic data in the form of a bit map. An engine driver controls, based on the graphic data, a semiconductor laser, a stepping motor for driving paper conveyor rollers, and so forth, thereby forming an image on a paper. However, because the engine driver is not informed of the number of copies to be continuously produced, it is impossible to adopt the above-stated motor control scheme using a counter.

SUMMARY OF THE INVENTION

It is therefore an object of the present invention to provide a control device for controlling a stepping motor included in an electronic apparatus, and capable of surely controlling the motor without increasing the load on a microprocessor.

In accordance with the present invention, a control device for controlling the drive of a stepping motor which drives a movable portion of an electronic apparatus and is totally controlled by a microprocessor has a motor driver for driving the stepping motor. A memory stores control data for the acceleration, constant-speed drive and deceleration of the stepping motor. A motor controller controls the stepping motor via the motor driver with the control data loaded without the intermediary of the microprocessor. The motor controller has a first constant-speed rotation control secton for repeatedly loading the control data assigned to the constant-speed drive a preselected number of times to thereby rotate the stepping motor at a constant speed, a second constant-speed rotation control section for repeatedly loading the control data assigned to the constant-speed drive until a constant-speed rotation end signal arrives to thereby rotate the stepping motor at the constant speed, and a selector for selecting one of the first and second constant-speed rotation control sections at a time.

Also, in accordance with the present invention, an electronic apparatus including a movable portion has a stepping motor for driving the movable portion, and a control device for controlling the drive of the stepping motor. The control device has a motor driver for driving the stepping motor. A memory stores control data for the acceleration, constant-speed drive and deceleration of the stepping motor. A motor controller controls the stepping motor via the motor driver with the control data loaded without the intermediary of the microprocessor. The motor controller has a first constant-speed rotation control secton for repeatedly loading the control data assigned to the constant-speed drive a preselected number of times to thereby rotate the stepping motor at a constant speed, a second constant-speed rotation control section for repeatedly loading the control data assigned to the constant-speed drive until a constant-speed rotation end signal arrives to thereby rotate the stepping motor at the constant speed, and a selector for selecting one of the first and second constant-speed rotation control sections at a time.

BRIEF DESCRIPTION OF THE DRAWINGS

The above and other objects, features and advantages of the present invention will become apparent from the following detailed description taken with the accompanying drawings in which:

FIGS. 9A and 9B are a flowchart showing a part of slue-up processing shown in FIG. 8;

FIG. 10 is a flowchart showing the other part of the slue-up processing (forward movement);

FIG. 13 is a flowchart showing the other part of the slue-down processing;

DESCRIPTION OF THE PREFERRED EMBODIMENT

Figure 1:
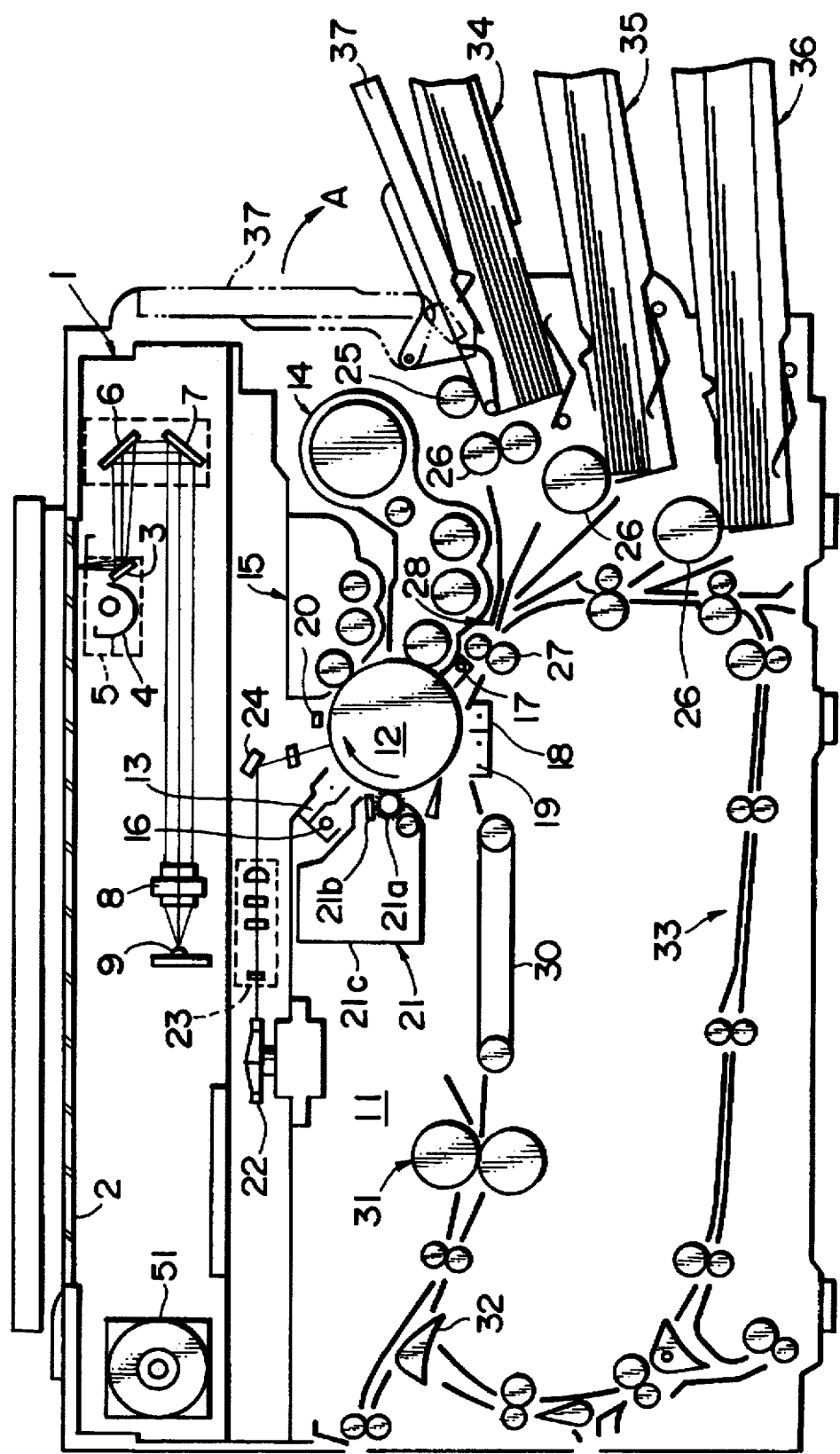
FIG. 1 is a section showing the general construction of a digital copier to which a stepping motor control device embodying the present invention is applied.

Referring to FIG. 1 of the drawings, a digital copier to which a stepping motor control system embodying the present invention is applied is shown. As shown, the copier is generally made up of a scanner section 1 and a printer section 11. The operator of the copier enters desired copying conditions on an operation panel, not shown, lays a document on a glass platen 2 included in the scanner section 1, and then presses a copy start key provided on the operation panel. In response, the scanner section 1 starts reading the document. Specifically, a first mirror 3 and a light source (fluorescent lamp) 4 as well as other conventional elements are mounted on a carriage (movable section) 5 together. A stepping motor (scanner motor) 51 causes the carriage 5 to move to the left, as viewed in FIG. 1, while scanning the underside or image surface of the document optically. The resulting imagewise reflection from the document is routed through the first mirror 3, a second mirror 6 and a third mirror 7 to a lens 8. The lens 8 focuses the incident imagewise light onto the photosensitive-surface of a CCD color image sensor 9. The image data read by the color image sensor 9 are written to an image memory which will be described.

In practice, the scanner section 1 starts reading the document after the carriage 5 has been moved about 10 mm to 30 mm by the motor 51, i.e., after the number of steps of the motor 51 has reached a preselected number. The interval between the start of movement of the carriage 5 and the arrival of the same at such a read start position is managed in a manner which will be described in detail later.

A single color image sensor 9 is shown in FIG. 1 simply for the illustrative purpose. In practice, a beam splitter equally divides the light beam from the lens 8 into three beams. The three beams are respectively input to three, i.e., R (red), G (green) and B (blue) image sensors via R, G and B color filters. Alternatively, an arrangement may be made such that R, G and B color filters are sequentially replaced so as to read R, G and B image data with a single image sensor. These alternative schemes are conventional with, e.g., a color copier.

The printer section 11 prints out the image data stored in the image memory. Specifically, a photoconductive element 12 is implemented as a drum and rotated in a direction indicated by an arrow in FIG. 1. A discharge lamp or quenching lamp (QL) 16, a pretransfer lamp (PTL) 17, a transfer charger 18, a separation charger 19, an eraser 20 and a cleaning unit 21 are driven in order to lower the potential of the surface of the drum 1 moved away from the QL 16 to substantially zero. This prevents toner and irregular potentials remaining on the drum 12 from reaching a main charger 13 or a developing unit 14 or 15. Subsequently, the main charger 13 charges the surface of the drum 12 uniformly. At the same time, the image data are read out of the image memory. A semiconductor laser, not shown, emits a laser beam in accordance with the image data. The laser beam is incident to a polygonal mirror 22 via a cylinder lens, not shown. The polygonal mirror 22 in rotation reflects the laser beam. As a result, the laser beam scans the surface of the drum 12 via optics (lens) 23 and a mirror 24, thereby electrostatically forming a latent image on the drum 12.

The developing units 14 and 15 store black toner and color toner, respectively. After the eraser 20 has dissipated the charge from the non-image area (needless area outside of an image forming area) of the drum 12, the developing unit 14 or 15 develops the latent image with the black toner or the color toner. As a result, the latent image is transformed to a corresponding toner image. At this instant, a bias voltage applied to the developing unit 14 or 15 may be varied to control the tonality of the image.

On the other hand, a stepping motor (main motor), not shown, selectively couples a paper feed clutch, not shown, so as to drive a pick-up roller 25 and one of three feed rollers 26. As a result, a single paper is fed from a paper feed stage selected beforehand toward a registration roller pair 27 held in a halt. A registration sensor 28 precedes the registration roller pair 27 and is implemented as, e.g., a reflection type photosensor. When the leading edge of the paper arrives at a position where it faces the sensor 28, it turns on the sensor 28. Then, on the elapse of a preselected period of time, the paper feed clutch is uncoupled in order to stop the movement of the paper.

The paper feed clutch remains in its uncoupled state for a period of time longer than the interval between the arrival of the leading edge of the paper at the sensor 8 and the arrival of the same at the roller pair 27. Consequently, after the leading edge of the paper has abutted against the roller pair 27, it is caused to bend so as to free the paper from, e.g., skewing. Thereafter, a registration clutch, not shown, is coupled in synchronism with the movement of the leading edge of the toner image carried on the drum 12. The registration clutch drives the roller pair 27 and causes them to convey the paper toward an image transfer position. At the image transfer position, the transfer charger 18 transfers the toner image from the drum 12 to the paper. Then, the separation charger 19 lowers the charge potential of the paper, i.e., adhesion acting between the paper and the drum 12. A separator 29 separates the paper from the drum 12.

A conveyor belt 30 is passed over two rollers and conveys the paper to a fixing unit including a fixing roller 31. The fixing roller 31 fixes the toner image on the paper with heat. If a simplex copy mode is selected, the paper is driven out of the copier to a tray, not shown, via the upper portion of a path selector 32. If a duplex copy mode is selected, the path selector 32 is switched in order to guide the paper downward into a refeed path 33.

The cleaning unit 21a has a cleaning brush 21a and a cleaning blade 21b. The brush 21a and blade 21b remove the toner remaining on the drum 12 after the image transfer and collects it in a tank 21c. Further, the QL 16 illuminates the entire surface of the drum 12 in order to dissipate the charge also remaining on the drum 12.

Three paper cassettes 34, 35 and 36 are removably mounted on the copier, and each is loaded with a stack of papers of particular size. A manual feed table or tray 37 is also available with the copier and allows papers of irregular sizes to be set thereon by hand. The operator intending to use the papers loaded in any one of the cassettes 34-36 selects the cassette on a paper size key provided on the operation panel, and then presses the copy start key. On the other hand, the operator intending to use a paper of irregular size opens the manual feed table 37 from a position indicated by a phantom line in a direction A, sets the paper on the table 37, and then presses the copy start key.

Figure 2:
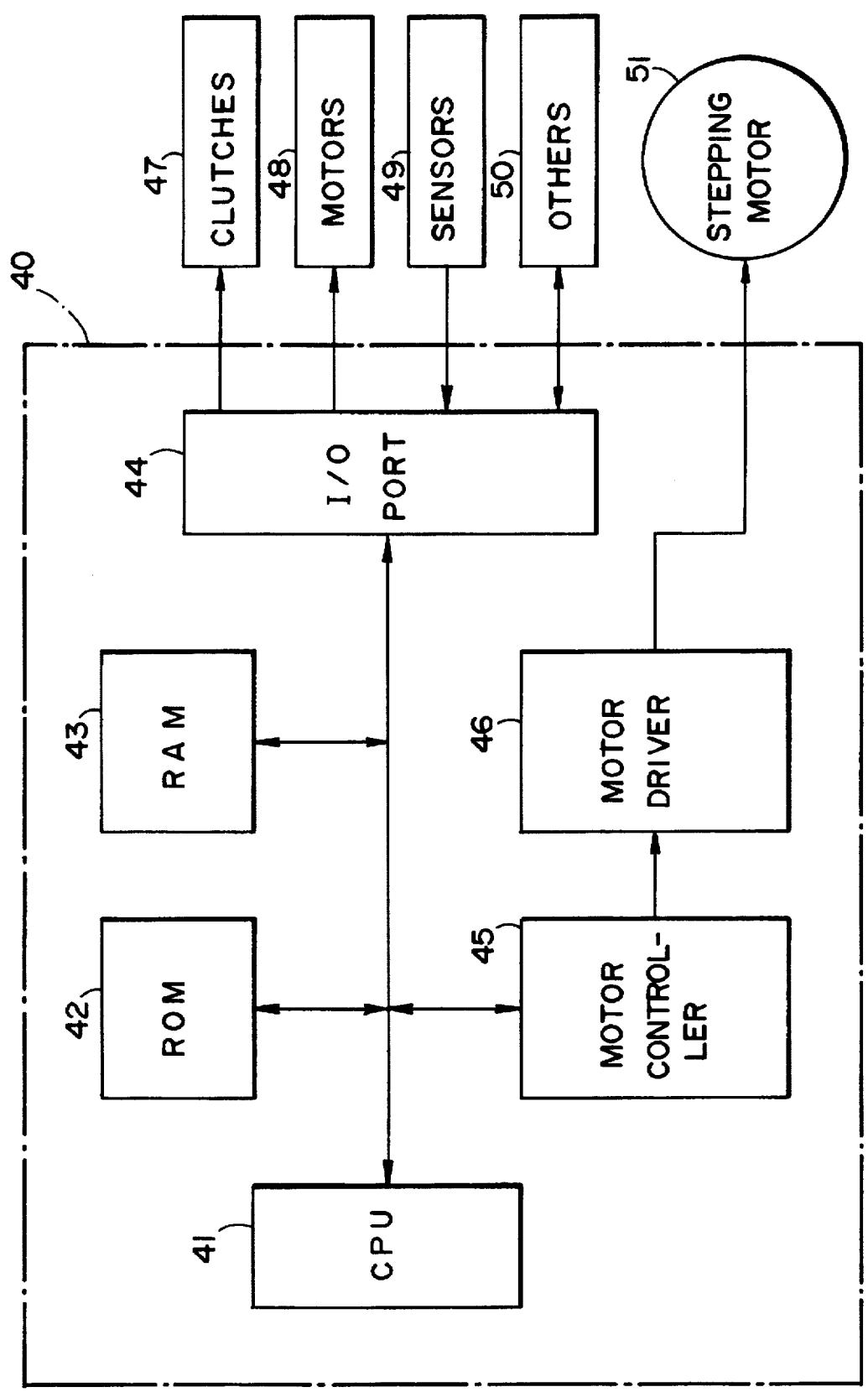
FIG. 2 is a block diagram schematically showing a specific configuration of a control section included in the embodiment.

FIG. 2 shows a part of a control section 40 included in the digital copier. As shown, the control section 40 includes a CPU (Central Processing Unit) 41, a ROM (Read Only Memory) 42, a RAM (Random Access Memory) 43, an I/O (Input/Output) port 44, a motor controller 45, and a motor driver 46. The CPU 41 is a general-purpose microprocessor capable of controlling the entire system 40. The ROM 42 stores a control program for causing the CPU 41 to operate, and various fixed data including control data assigned to the acceleration, constant-speed drive and deceleration of the stepping motor 51 (step-by-step pulse rate data). The RAM 43 selectively serves as a work memory with which the CPU 41 processed data, or as the previously mentioned image memory. The I/O port 44 controls the interchange of signals between the control section 40 and clutches 47, motors 48 (except for the stepping motor 51), sensors 49, and others 50. The motor controller 45 feeds phase drive signals synchronous to drive pulses to the motor driver 46, as will be described in detail later.

Figure 3:
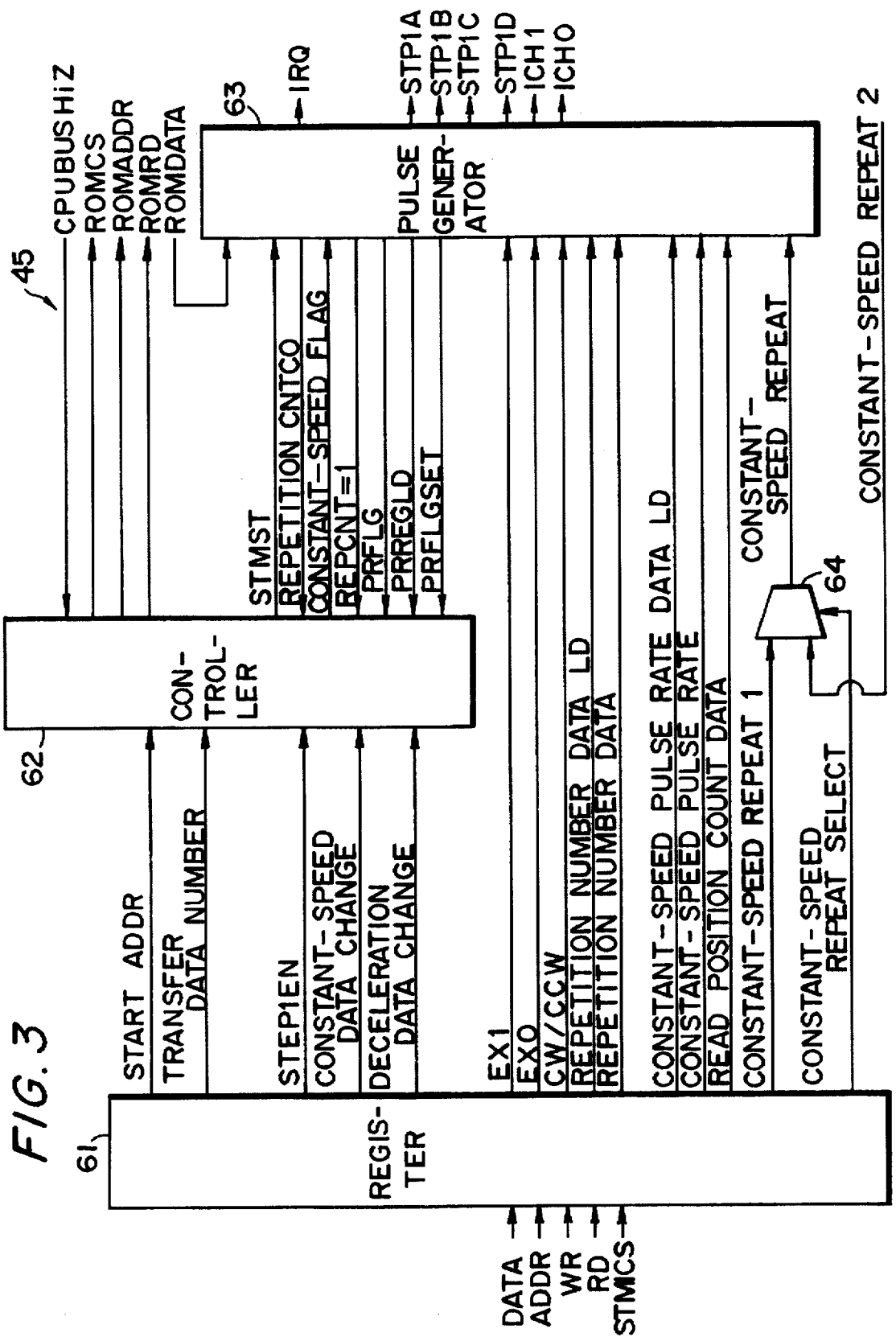
FIG. 3 is a block diagram schematically showing a specific configuration of a motor controller included in the control section.

A specific configuration of the motor controller 45 is shown in FIG. 3. As shown, the motor controller 45 has a register 61, a controller 62, a pulse generator 63, and a selector 64. These constituents 61-64 are connected by various signal (data) lines, as illustrated. The register 61 stores data (signals) transferred (loaded) from the CPU 41 for a moment. The controller 62 executes control for transferring the pulse rate data stored in the ROM 42 to the pulse generator 63 without the intermediary of the CPU 41. The pulse generator 63 generates drive pulses based on the pulse rate data received from the ROM 42. Also, the pulse generator 63 generates, in synchronism with the drive pulses, phase drive signals for driving phase coils included in the motor 51. The selector 64 receives a constant-speed repeat 1 signal (constant-speed rotation end signal) from the CPU 41 via the register 61 or receives a constant-speed repeat 2 signal (constant-speed rotation end signal) from an external unit, e.g., printer controller. In addition, the selector 64 receives a constant-speed repeat select signal from the CPU 41 via the register 61. The selector 64 selects one of the constant-speed repeat 1 signal and constant-speed repeat 2 signal on the basis of the select signal, and feeds it to the pulse generator 63 as a constant-speed repeat signal.

The CPU 41 inputs to the register 61 data DATA, an address ADDR for writing or reading data in or out of the register 61, a write signal WR for writing data in the register 61, a read signal RD for reading data out of the register 61, and a select signal STM1CS for selecting the motor controller 45.

A start address signal (START ADDR) is representative of the start address of the pulse rate data stored in the ROM 42. Transfer number data is indicative of the number of pulse rate data to be transferred (loaded). A motor start signal STP1EN is used to start driving the stepping motor 51. A constant-speed data change signal shows that the pulse rate data for the constant-speed drive of the motor 51 should be changed. A deceleration data change signal shows that the pulse rate data for the deceleration of the motor 51 should be changed.

Bit signals EX1 and EX0 are used to select a method of driving the motor 51 while a bit signal CW/CCW is used to select a direction in which the motor 51 should rotate. Repetition number data is indicative of how many times the pulse rate data for the constant-speed drive of the motor 51 should be repeated. Repetition number data LD is a repetition number data load signal for transferring the above number of times of repetition to a repetition counter which will be described. Constant-speed pulse rate data is indicative of a pulse rate for the constant-speed drive of the motor 51, but set by the CPU 41. Constant-speed pulse rate data LD is a signal for transferring the above pulse rate data to a preload register which will be described. Read position count data is representative of a count corresponding to the period of time necessary for the carriage 5 to reach the read start position (number of steps of the motor 51).

A count enable signal STMST enables a motor counter which will be described. A repetition CNTCO signal is a carry signal showing that the repetition number counter has reached "0". A constant-speed flag causes the motor 51 to be driven at a constant-speed. A count signal REPCNT=1 shows that the repetition number counter has reached "1". A preload flag (data transfer request signal) PRFLAG is used to request the transfer of the pulse rate data stored in the ROM 42. A signal PRREGLD is used to transfer the pulse rate data stored in the ROM 42 to the preload register. A signal PRFLGSET is used to set the preload flag to "1".

A signal CPUBUSHiZ shows whether or not the data bus, address bus and control bus (write signal line or read signal line) of the CPU 41 are in their high impedance states (out of use). A signal ROMCS is used by the motor controller 45 to select the ROM 42 for obtaining the pulse rate data therefrom. A signal ROM ADDR designates the address of, among the pulse data stored in the ROM 42, the pulse data to be obtained. A signal ROMRD is used to obtain (read) the pulse rate data from the designated address of the ROM 42. Data ROMDATA are the data transferred from the ROM 42.

A signal IRQ (coincidence signal) appears when the number of drive pulses counted, which will be described, coincides with the number of the read position count data. Phase drive signals STP1A, STP1B, STP1C and STP1D drive the phase coils of the stepping motor 51. Motor control signals ICH1 and ICH0 are added when the motor 51 is driven in a quarter-step drive mode which will be described.

Figure 4:
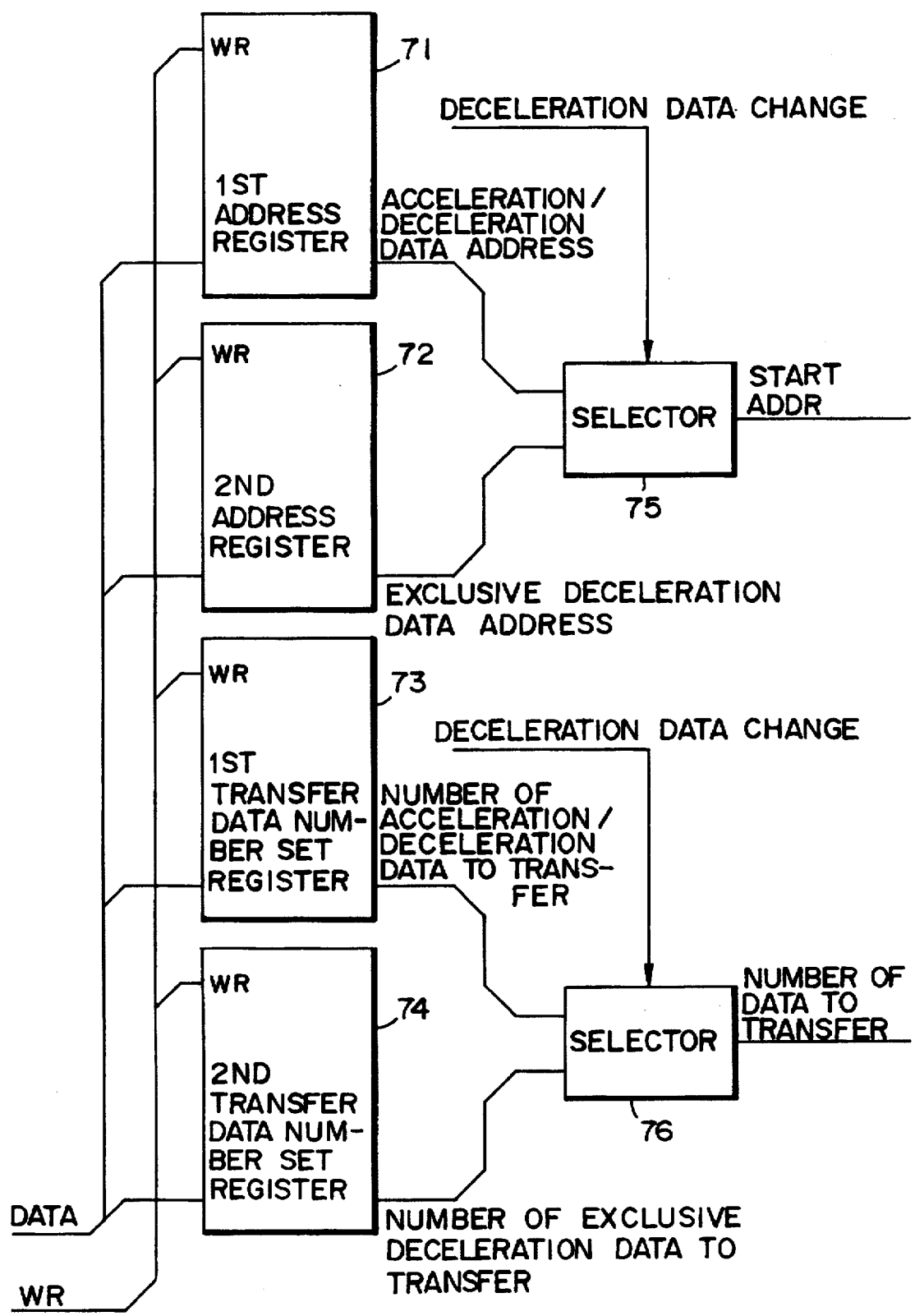
FIG. 4 is a schematic block diagram showing a specific configuration of a register included in the motor controller shown in FIG. 3.

FIG. 4 shows a specific construction of a data transfer control section included in the register 61. As shown, the control section consists of a first address register 71, a second address register 72, a first transfer data number set register 73, a second transfer data number set register 74, and selectors 75 and 76. The first address register 71 stores and sets, in response to the write signal WR fed from the CPU 41, a data address signal transferred from the CPU 41 and common to acceleration and deceleration. The data address signal designates the start address where, among the pulse rate data stored in the ROM 42, the same pulse data for the acceleration and deceleration of the motor are stored. The second address register 72 stores, sets and outputs, in response to the write signal from the CPU 41, a data address signal transferred from the CPU 41 and exclusively assigned to deceleration. The exclusive data address signal designates the start address where, among the pulse rate data stored in the ROM 42, the data exclusively used for the deceleration of the motor 51 are stored.

The first transfer number set register 73 stores, sets and outputs, in response to the write signal from the CPU 41, the number of data to be transferred and common to acceleration and deceleration. Specifically, this data is representative of the number of, among the pulse rate data stored in the ROM 42, the same pulse rate data for acceleration and deceleration. The second transfer data number register 74 stores, sets and outputs, in response to the write signal from the CPU 41, the number of data to be transferred and exclusively assigned to deceleration, i.e., the data stored in the ROM 42 and used only for deceleration.

The selector 75 usually selects the common acceleration/deceleration data address signal fed from the address register 71 and outputs it as the start address signal START ADDR. On receiving the deceleration data change signal from the CPU 41, the selector 75 selects the exclusive deceleration data address signal input from the address register 72 and outputs it as the start address signal. The selector 76 usually selects the number of data to be transferred and common to acceleration and deceleration fed from the transfer data number set register 73. On receiving the deceleration data change signal from the CPU 41, the selector 76 selects the number of data to be transferred and exclusively assigned to deceleration input from the register 74.

Figure 5:
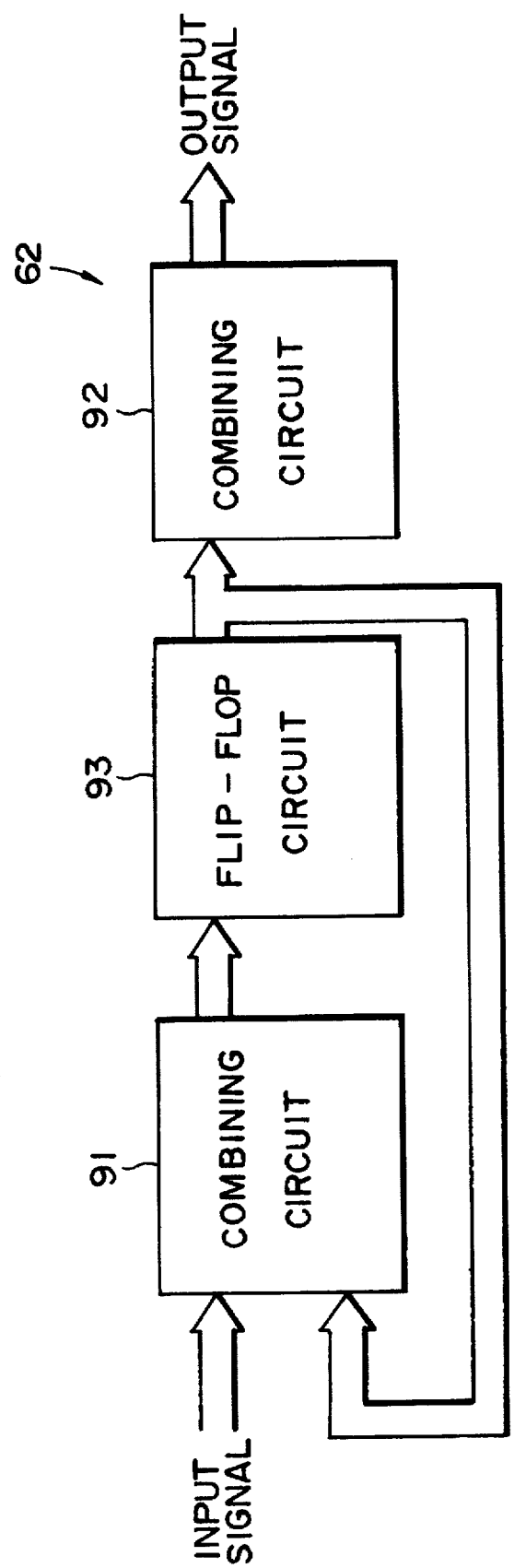
FIG. 5 is a schematic block diagram showing a specific configuration of a controller included in the motor controller of FIG. 3.

FIG. 5 shows a specific configuration of the controller 62 shown in FIG. 3. The controller 62 is made up of a plurality of hardware sequencers based on the Moore Machine principle. As shown, each hardware sequencer has combining circuits 91 and 92 each consisting of various kinds of logic circuits, and a flip-flop 93. The hardware sequencers are respectively assigned to slue-up processing, constant-speed processing, and slue-down processing, and each is operable independently of the others.

Figure 6:
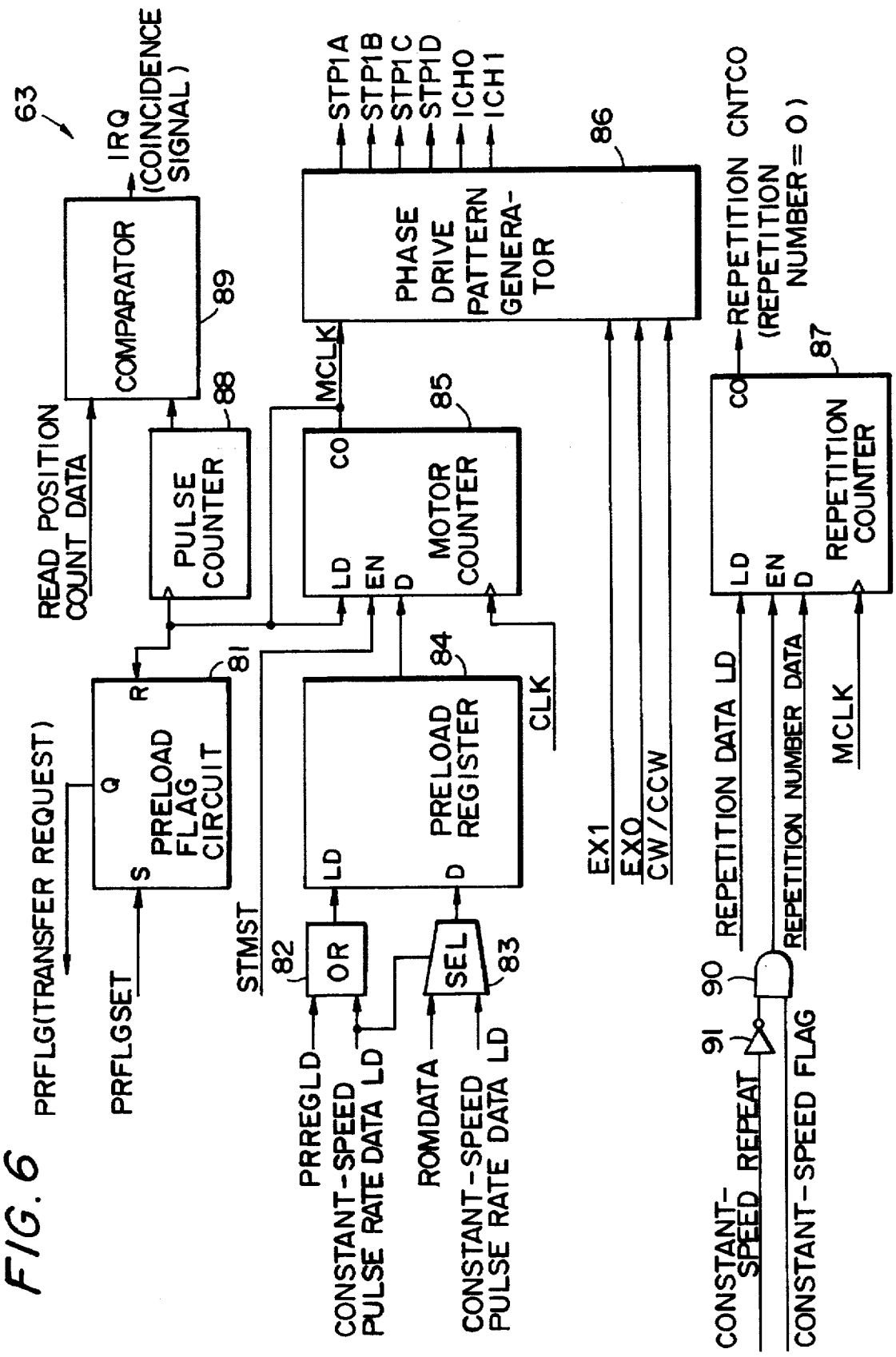
FIG. 6 is a schematic block diagram showing a specific configuration of a pulse generator included in the motor controller of FIG. 3.

FIG. 6 shows a specific construction of the pulse generator 63 shown in FIG. 3. As shown, the pulse generator 63 has a preload flag circuit 81, an OR gate 82, a selector 83, a preload register 84, a motor counter 85, a phase drive pattern generator 86, a repetition counter 88, a comparator 89, an AND gate 90, and an inverter 91.

When the controller 62 sends the preload flag set signal (PRELGSET) to the preload flag circuit 81, the circuit 81 is set and does not request the transfer (loading) of the pulse rate data (ROMDATA) (PRFLG="1"). On receiving the synchronizing pulse (MCLK) from the motor counter 85, the circuit 81 is reset and requests the transfer of the pulse rate data (PRFLG="0"). When the OR gate 82 receives the pulse data load signal (PRREGLD) from the controller 62, it directly outputs it. On receiving the constant-speed pulse rate data load signal or data LD from the register 61, the OR gate 82 directly outputs it. The selector 83 usually selects and outputs the pulse rate data (ROMDATA) loaded from the ROM 42. Only when the selector 83 receives the constant-speed pulse data load signal from the register 61, the selector 83 selects the constant-speed pulse rate data (set by the CPU 41) output from the register 61 and outputs it. When the preload register 84 receives the output signal of the OR gate 82, it takes in the pulse rate data from the selector 83 and outputs it.

When the motor counter 85 receives a load signal, not shown, from the controller 62, it sets the pulse rate data (number of pulse rates) output from the preload register 84. On receiving the count enable signal from the controller 62 (STMST="1"), the counter 85 is enabled and starts decrementing (or incrementing) in synchronism with a reference clock (CLK) output from a reference oscillator, not shown. When the count reaches "0" (or the number of pulse rates), the counter 85 once stops decrementing (or incrementing) and generates a synchronizing pulse (MCLK). Then, the counter 85 again sets the pulse rate data output from the preload register 84, starts decrementing, and then repeats the above procedure. When the count enable signal from the controller 62 disappears (STMST="0"), the counter 85 is inhibited from decrementing. The phase drive pattern generator 86 selects a particular driving method and a particular driving direction for the motor 51 as instructed by the signals EX1, EX0 and CW/CCW output from the register 61. Then, the pattern generator 86 outputs the phase drive signals STP1A, STP1B, STP1C and STP1D in synchronism with the synchronizing pulses fed from the counter 85. Additionally, when the motor 51 is driven in a quarter-step mode, the pattern generator 86 outputs the motor control signals ICH1 and ICH0.

Figure 14:
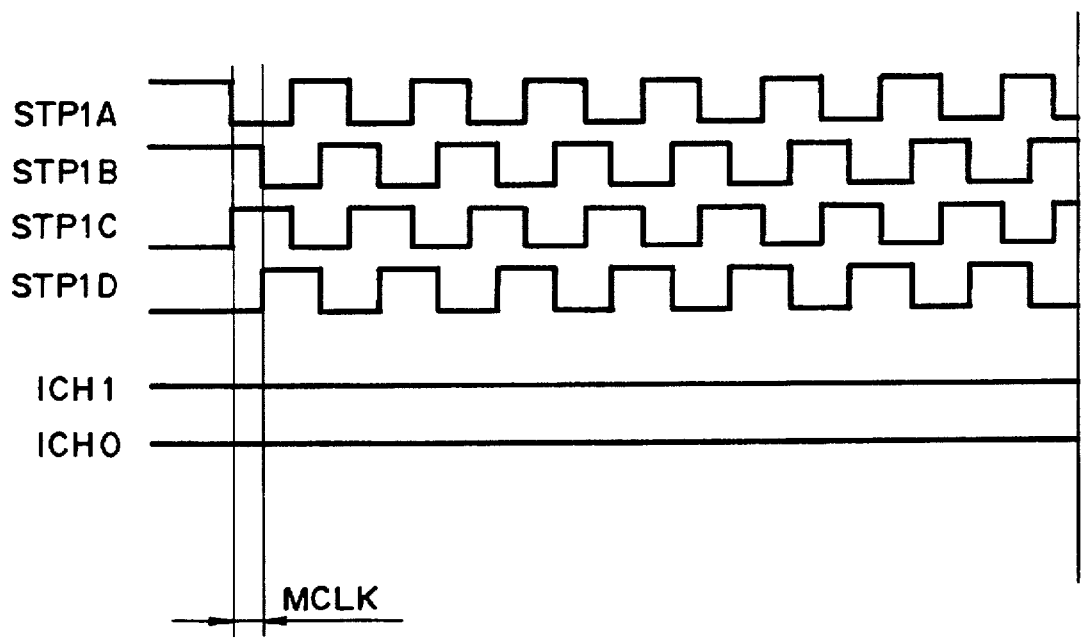
FIG. 14 is a timing chart showing phase drive signals and motor control signals to appear when the motor of FIG. 2 is rotated forward in a full-step mode.
Figure 15:
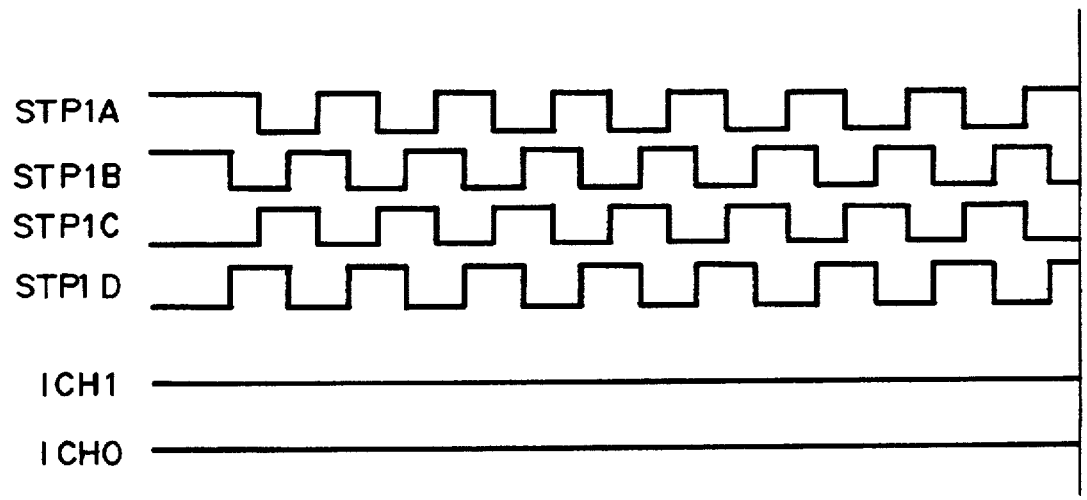
FIG. 15 is a timing chart similar to FIG. 14, showing the signals to appear when the motor is reversed in the full-step mode.
Figure 16:
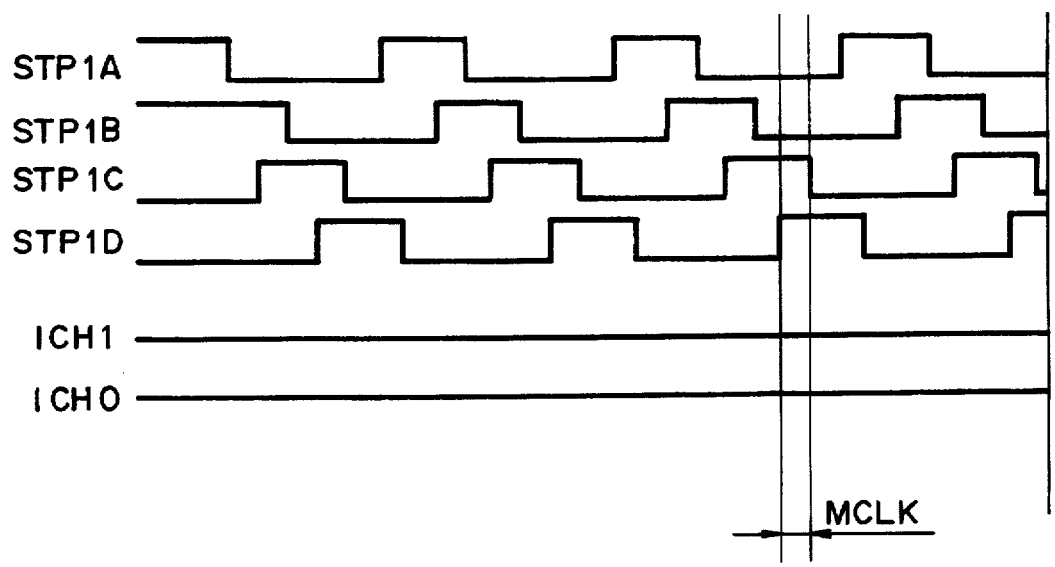
FIG. 16 is a timing chart also similar to FIG. 14, showing the signals to appear when the motor is rotated forward in a half-step mode.
Figure 17:
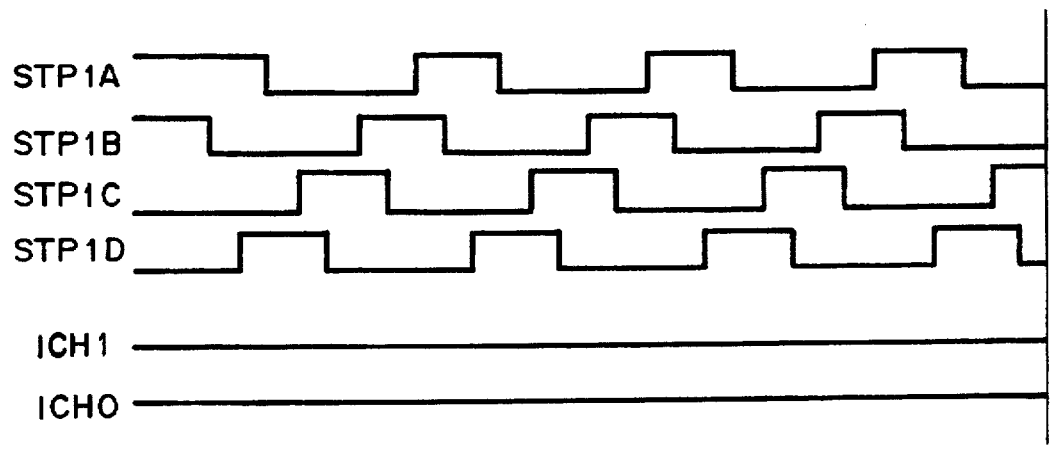
FIG. 17 is a timing chart similar to FIG. 16, showing the signals to appear when the motor is reversed in the half-step mode.
Figure 18:
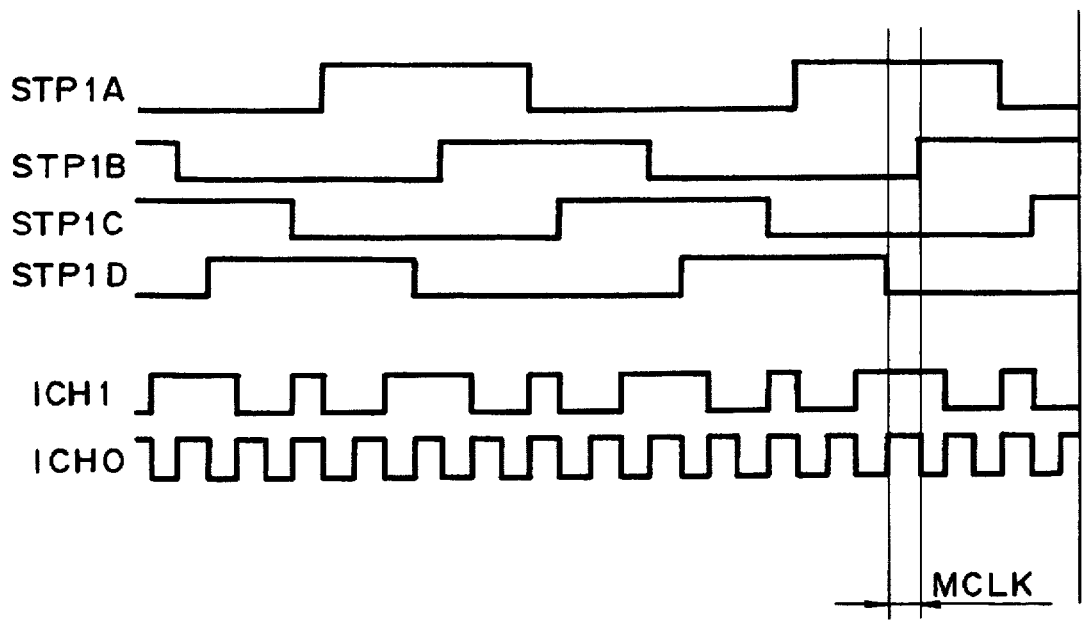
FIG. 18 is a timing chart similar to FIG. 14, showing the signals to appear when the motor is rotated forward in a quarter-step mode.
Figure 19:
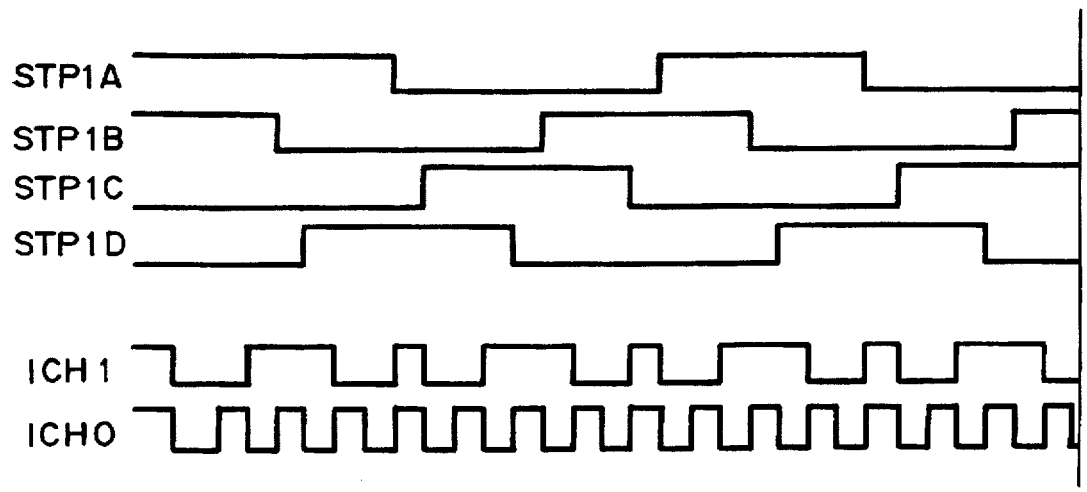
FIG. 19 is a timing chart similar to FIG. 18, showing the signals to appear when the motor is reversed in the quarter-step mode.

The motor 51 is selectively driven by methods respectively corresponding to full-step drive, half-step drive (½ of the rotation speed assigned to full-step drive), and quarter-step drive (¼ of the rotation speed assigned to full-step drive). FIGS. 14–19 each shows the phase drive signals and motor control signals appearing in a particular combination of the driving method and rotating direction of the motor 51. Specifically, FIG. 14 shows the phase drive signals and motor control signals to appear when the motor 51 is rotated forward by the full-step drive. FIG. 15 shows the signals to appear when the motor 51 is reversed by the full-step drive. FIG. 16 shows the signals to appear when the motor 51 is driven forward by the half-step drive. FIG. 17 shows the signals to appear when the motor 51 is reversed by the half-step mode. FIG. 18 shows the signals to appear when the motor 51 is driven forward by the quarter-step drive. Further, FIG. 19 shows the signals to appear when the motor 51 is reversed by the quarter-step drive.

When the repetition counter 87 receives the repetition data load signal from the register 61, it sets the data representative of the number of times of repetition and also received from the register. When the constant-speed flag of the controller 62 is set to "1", the counter 87 is enabled and decrements in synchronism with the synchronizing pulses (MCLK) fed from the motor counter 85. When the counter 85 reaches "0", it stops decrementing and outputs the carry signal (REPETITION CNTCO). The pulse counter 88 counts the synchronizing pulses output from the motor counter 85, and outputs data representative of the count to the comparator 89. After the coincidence signal (IRQ) has been fed from the comparator 89 to the CPU 41, the counter 88 is reset to "0" by a reset signal, not shown. The reset signal may be output from the CPU 41. Alternatively, a delay circuit may be used to delay the coincidence signal output from the comparator 89 so as to produce the reset signal.

The comparator 89 compares the count represented by the read position count data output from the register 61 and the count represented by the output data of the pulse counter 88. When the two different data coincide with each other, the comparator 89 delivers the coincidence signal (IRQ) to the CPU 41. The AND gate 90 changes its output to "1" only when both the constant-speed flag of the controller 62 and the constant-speed repeat signal output from the inverter 91 are "1". The inverter 91 inverts the constant-speed repeat signal output from the selector 64.

In the illustrative embodiment, both the constant-speed repeat 1 signal and the constant-speed repeat 2 signal input to the selector 64 are held to be "0". This maintains the constant-speed repeat signal input to the inverter 91 to be "0" at all times and thereby enables the repetition counter 87 only in accordance with the status of the constant-speed flag.

A reference will be made to FIG. 7 for describing a specific operation of the control section 40 included in the copier. The routine to be described starts when the operator presses the copy start key. As shown, the CPU 41 sets data necessary for driving the motor 51 in the register 61 of the motor controller 45. The necessary data are the start address of the pulse rate data stored in the ROM 42 and used for both the acceleration and deceleration (acceleration/deceleration pulse rate data), the number of data to be transferred, and the data representative of the number of times of repetition of the pulse rate data assigned to the constant-speed drive of the motor 51 (constant-speed pulse rate data or exclusive constant-speed pulse rate data (repetition number data). If necessary exclusive constant-speed pulse rate data, the start address of exclusive deceleration pulse rate data (different from the acceleration/deceleration pulse rate data), the number of the data to be transferred and so forth may be set on the operation panel. A plurality of different constant-speed pulse rate data are stored in the ROM 42 or the RAM 43; one of them may be read out in response to a signal output from the operation panel and set in the register 61.

Subsequently, forward rotation (CW) is set in the register 61 of the motor controller 45 as a direction of rotation of the motor 51 (CW/CCW="1"). When the motor 51 is rotated forward, the carriage 5 of the scanner section 1 moves in the forward direction. After the previously mentioned read position count data has been set, the motor start signal (STP1EN) is output at a preselected timing. In response, the motor controller 45 executes pulse rate generation processing, which is hardware processing, and thereby rotates the motor 51 forward by a preselected number of pulses. On the completion of the pulse rate generation processing, the CPU 41 recognizes it in response to end interrupt signals which will be described later. Then, the CPU 41 again sets the data necessary for driving the motor 51 in the register 61 of the motor controller 45. On the elapse of a preselected holding time, the CPU 41 sets reverse rotation (CCW) as the direction of rotation of the motor 51 (CW/CCW="0"). The reverse rotation of the motor 51 causes the carriage 5 to move in the return direction. Subsequently, the CPU 41 outputs the motor start signal (STP1EN) at a preselected timing. In response, the motor controller 45 again executes the pulse rate generation processing so as to reverse the motor 51 by a preselected number of pulses. When a preselected period of time elapses since the end of the reverse rotation of the motor 51, the CPU 41 turns off the drive current for the motor 51.

Figure 7:
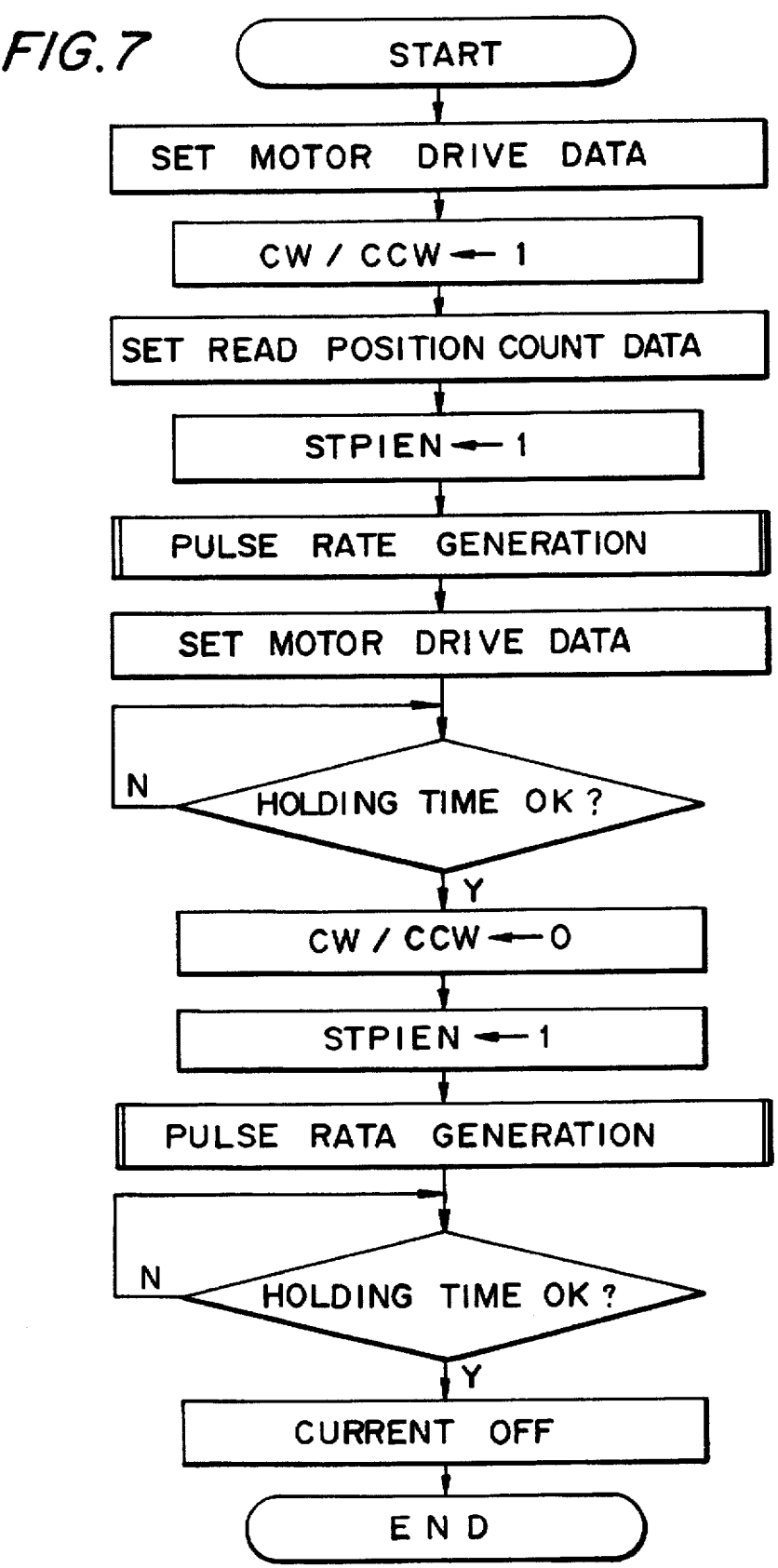
FIG. 7 is a flowchart demonstrating a specific operation of the control section.
Figure 8:
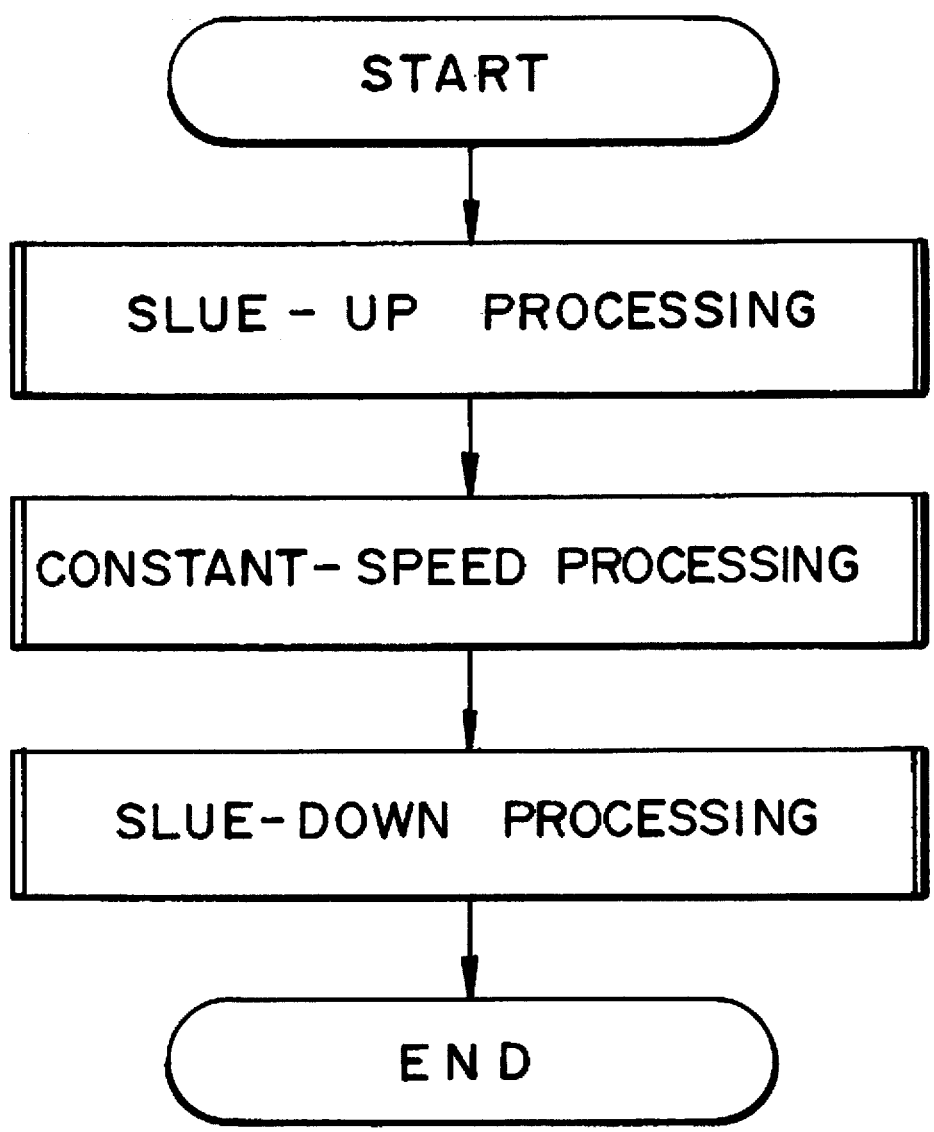
FIG. 8 is a flowchart representative pulse rate generation processing shown in FIG. 7.

FIG. 8 shows the pulse rate generation procedure (hardware processing) of FIG. 7 in detail. Slue-up processing, constant-speed processing and slue-down processing which will be described are respectively executed by the hardware sequencers of the controller 62. Among them, the slue-up processing and constant-speed processing slightly differ from the forward movement to the return movement of the carriage 5. In the illustrative embodiment, while the carriage 5 is in its forward movement, the synchronizing pulses output from the motor counter 85 are counted. When the count coincides with the count represented by the read position count data set in the register 61, the coincidence signal is output. Alternatively, such a procedure may be executed during the return movement of the carriage 5.

Figure 9B:
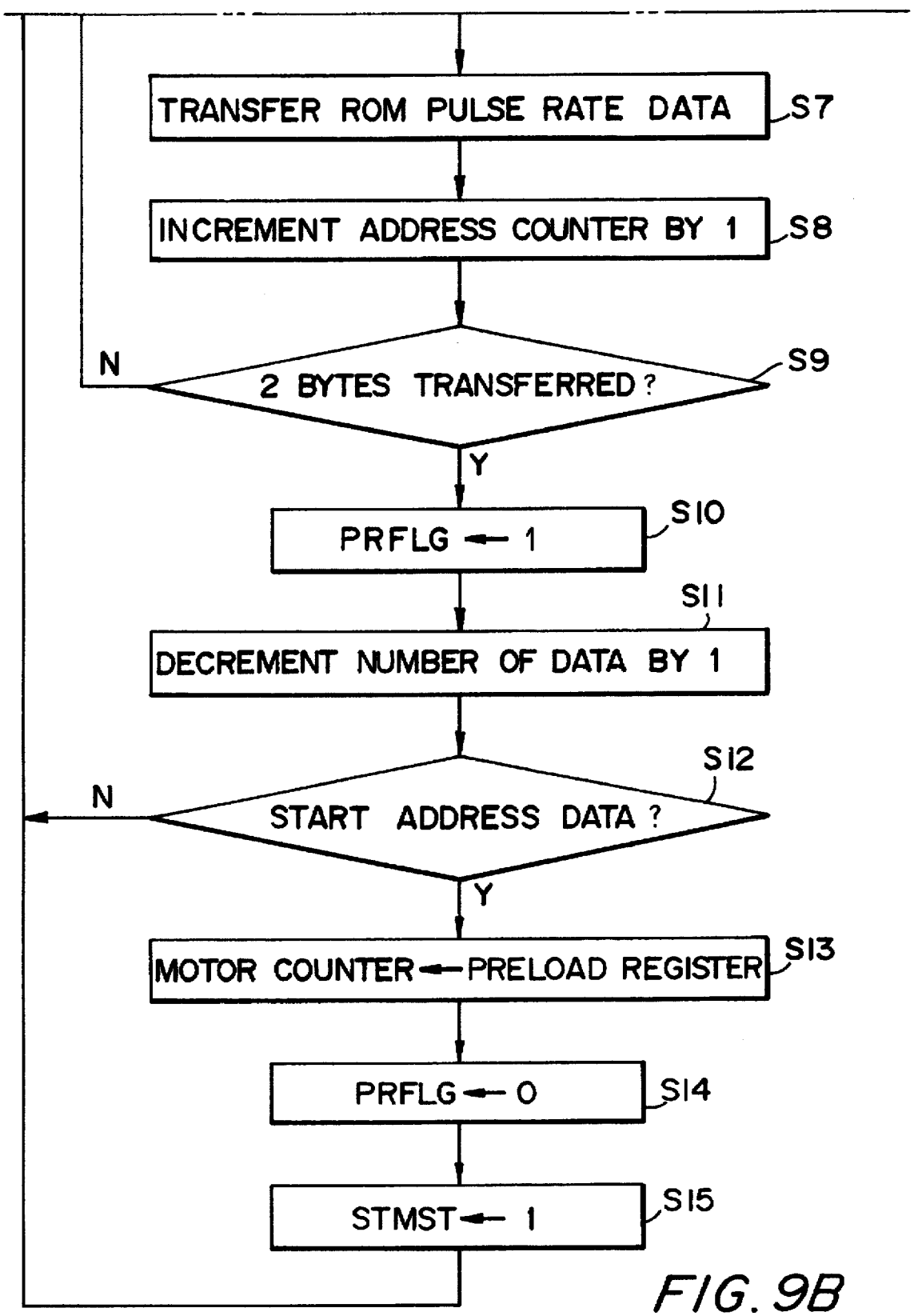

FIGS. 9 and 10 each shows the slue-up processing (corresponding to the forward movement of the carriage 5) specifically. The procedures shown in FIGS. 9 and 10 start up independently of each other.

In FIG. 9, the controller 62, FIG. 3, determines whether or not the motor start signal has been input (STEP1EN="1") (step S1). If the answer of the step S1 is positive (YES), the controller 62 sets the slue-up flag to "1" (step S2). Then, the controller 62 determines whether or not the number of acceleration/deceleration pulse rate data to be transferred is "0" (step S3). If the answer of the step S3 is negative (NO), the controller 62 determines whether or not the slue-up flag is "1" (step S4). If the answer of the step S4 is YES, the controller 62 determines whether or not the pulse generator 63 is requesting the transfer (loading) of the pulse rate data (ROMDATA) (PRFLG="0") (step S5). If the answer of the step S5 is YES, the controller 62 determines whether or not the CPU 41 is not using the bus (CPUBUSHiZ="1") (step S6). If the answer of the step S6 is YES, the controller 62 causes, among the acceleration/deceleration pulse rate data stored in the ROM 42, the data of the address designated by a ROM address counter, not shown, (initially the start address) to be transferred to the pulse generator 63 (step S7).

Thereafter, the controller 62 increments the ROM address counter (up mode at this time) by 1 (one) (step S8).

Although not shown in FIG. 9, the ROM address counter sets, in response to the start address signal (START ADDR) fed from the register 61, the start address of the acceleration/ deceleration pulse rate data (or deceleration pulse rate data) stored in the ROM 42. When the counter is enabled, it increments if the up mode is set up or decrements if the down mode is set up, thereby designating the address.

The controller 62 determines whether or not two bytes of acceleration/deceleration pulse rate data (two bytes are used as a unit) have been transferred (step S9). If the answer of the step S9 is NO, the program returns to the step S6. If the answer of the step S9 is YES, the controller 62 sets the preload flag circuit 81, FIG. 6, (PRFLAG="1") (step S10), thereby canceling the pulse rate data transfer request. Subsequently, the controller 62 decrements the number of acceleration/deceleration pulse rate data to be transferred by 1 (step S11). Then, the controller 62 determines whether or not the pulse rate data transferred this time is the first data (start address) (step S12). If the answer of the step S12 is NO, the controller 62 returns to the step S4. If the answer of the step S12 is YES, the controller 62 sets the acceleration/ deceleration pulse rate data (number of pulse rates) fed from the preload register 84 in the motor counter 85 (step S13). Then, the controller 62 resets the preload flag circuit 81 (PRFLG="0") so as to request the transfer of the pulse rate data (step S14). Thereafter, the controller 62 sets the count enable signal (STMST) to "1" to enable the motor controller 85 (step S15), and then returns to the step S4.

When the motor counter 85 is enabled, as stated above, it decrements in synchronism with the reference clock. On reaching "0", the counter 85 once stops decrementing and generates a synchronizing pulse (MCLK="1"), again sets the pulse rate data fed from the preload register 84, and then repeats the above procedure.

The phase drive pattern generator 86, FIG. 6, selects a particular driving method and a particular direction of rotation of the motor 51 on the basis of the signals EX1, EX2 and CW/CCW received from the register 61. Further, the pattern generator 86 sends the phase drive signals and, if necessary, motor control signals to the motor driver 46, thereby driving the motor 51.

On the other hand, in FIG. 10, the controller 62 determines whether or not the slue-up flag is "1" (step S21). Only if the answer of the step S21 is YES, the controller 62 determines whether or not the motor counter 85 has generated a synchronizing pulse (MCLK) (MCLK="1") (step S22). This can be done with reference to the preload flag. If the answer of the step S22 is YES, the controller 62 increments the pulse counter 88 by 1 (step S23), and then determines whether or not the number of acceleration/ deceleration pulse rate data to be transferred is "0" (step S24). If the answer of the step S24 is NO, the controller 62 sets the acceleration/deceleration pulse rate data (number of pulse rates) received from the preload register 84 in the motor counter 85 (step S25). After resetting the preload flag (PRFLG) (step S26), the controller 62 returns to the step S27 so as to repeat the above procedure. When the answer of the step S24 turns from NO to YES, the controller 62 generates a slue-up end interrupt signal (step S27), resets the slue-up flag to "0", and sets the constant-speed flag to "1".

Figure 11A:
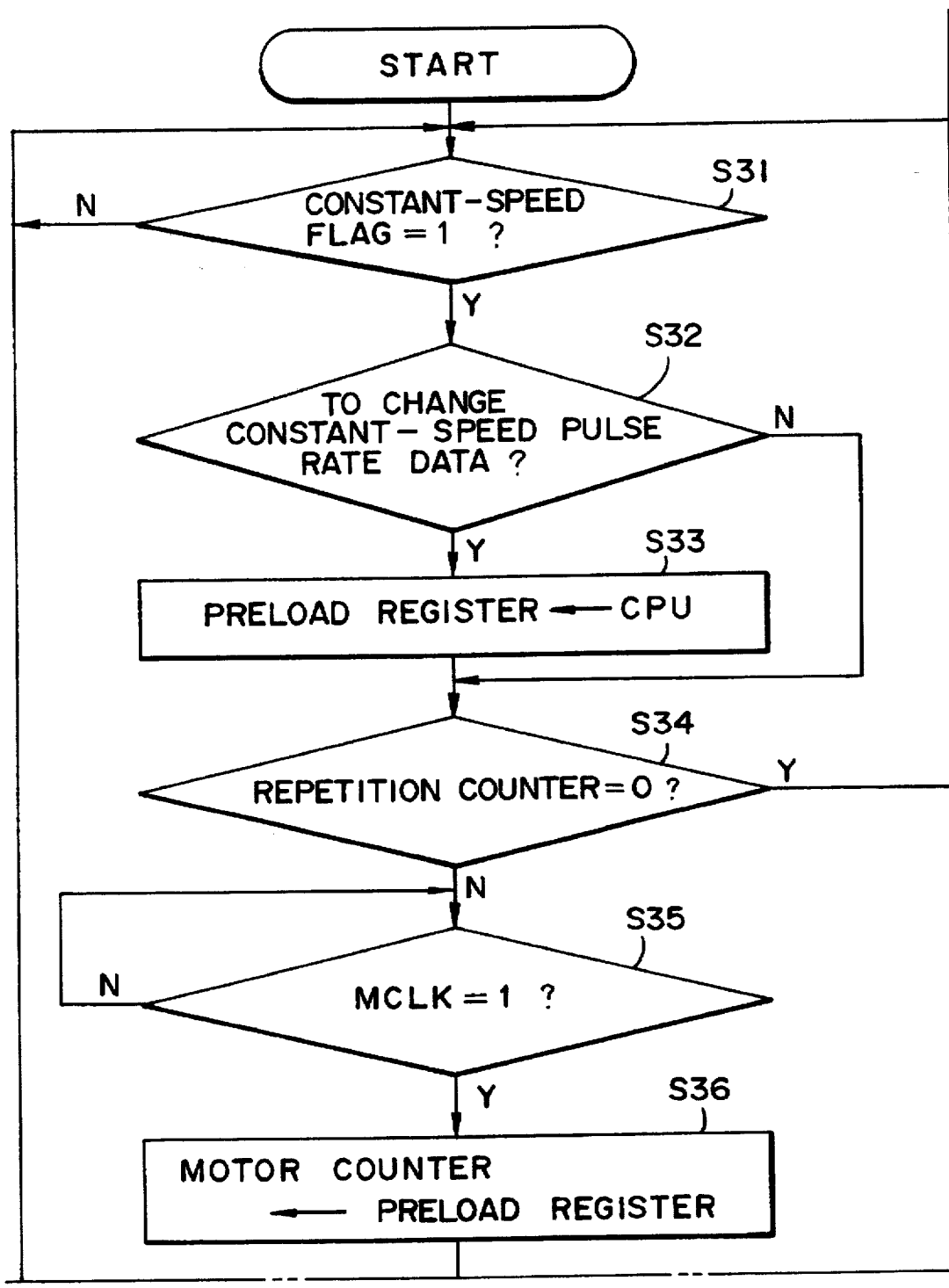
FIGS. 11A–11C are a flowchart demonstrating constant-speed processing (forward movement) shown in FIG. 8.
Figure 11B:
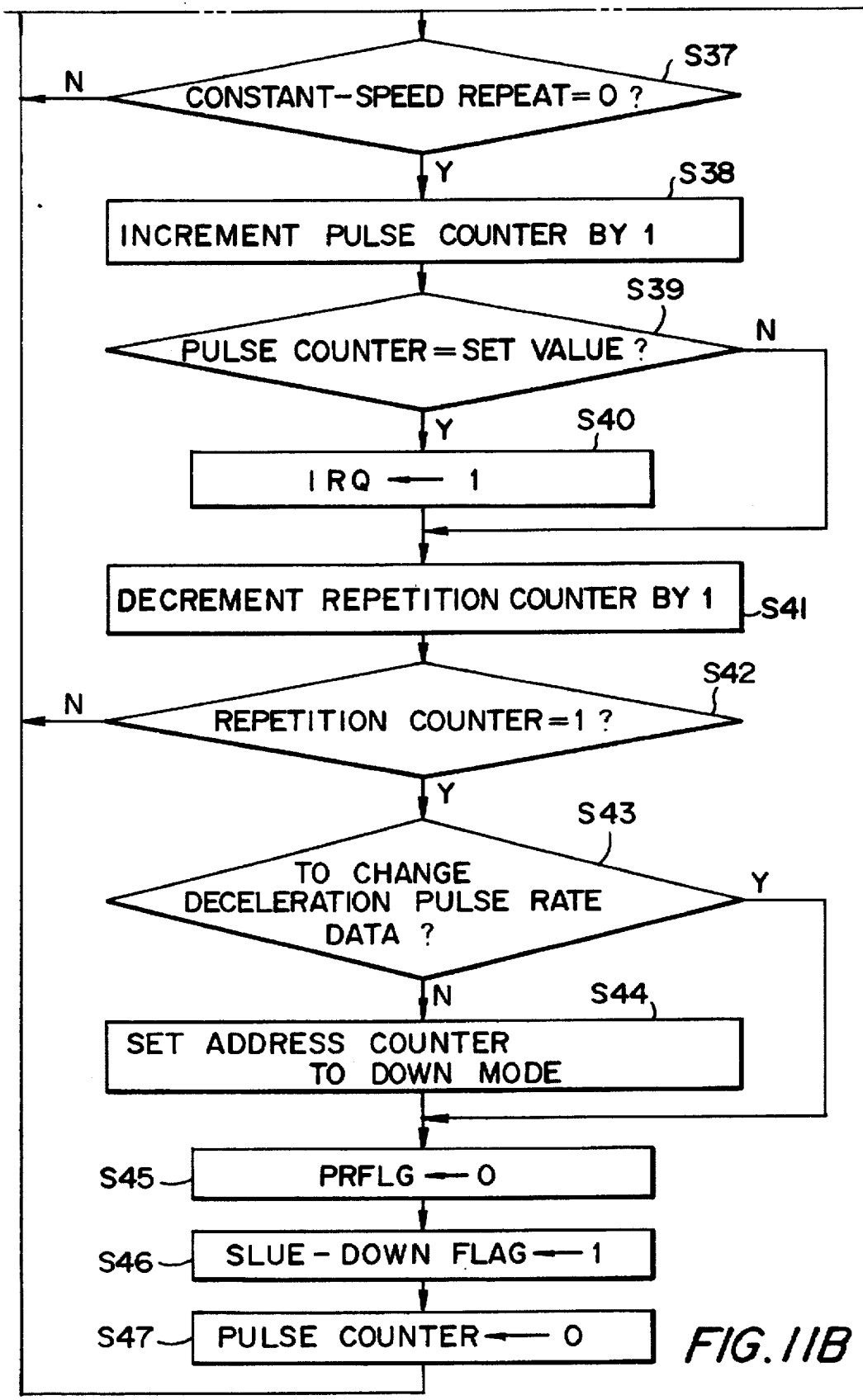
Figure 11C:
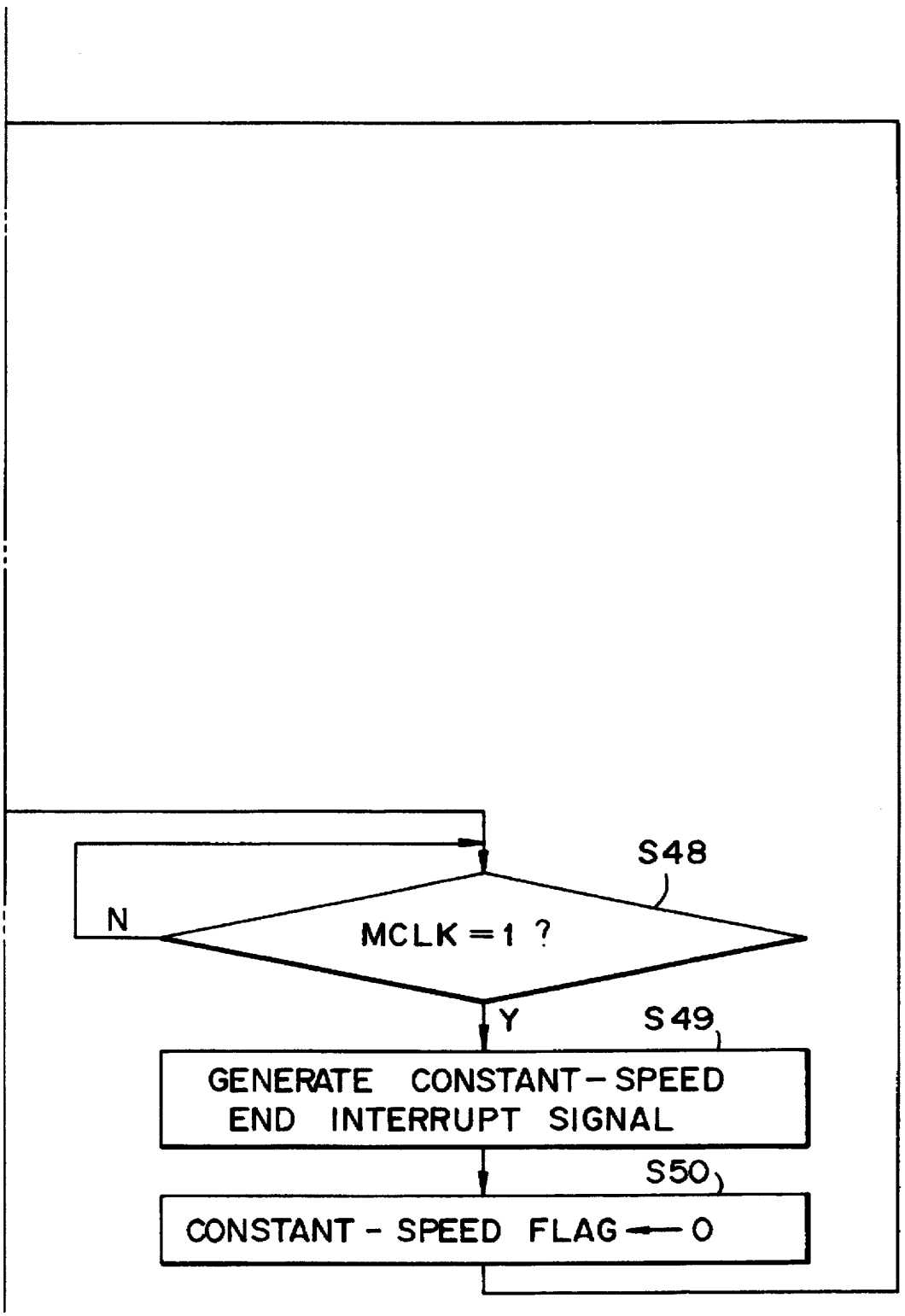

FIG. 11 shows the constant-speed processing (corresponding to the forward movement of the carriage 5) shown in FIG. 8. As shown, the controller 62 determines whether or not the constant-speed flag is "1" (step S31). If the answer of the step S31 is YES, the controller 62 determines whether or not to change the constant-speed pulse rate data, i.e., whether or not to replace the constant-speed pulse rate data included in the acceleration/ deceleration pulse rate data with constant-speed pulse rate data fed from the CPU 41 (step S32). This can be done by determining whether or not the constant-speed data change signal is present. If the answer of the step S32 is YES, meaning that constant-speed pule rate data has been set in the register 61 by the CPU 41, the controller 62 sets it in the preload register 84. Then, the controller 62 checks the repetition counter 87 to see if its count is "0" (step S34).

If the answer of the step S34 is NO, the controller 62 determines whether or not the motor 85 has generated a synchronizing pulse (MCLK="1") (step S35). If the answer of the step S35 is YES, the controller 62 sets the constant-speed pulse rate data received from the preload register 84 in the motor counter 85 (step S36), and then determines whether or not the constant-speed repeat signal is "0" (step S37). Because the constant-speed repeat signal is held to be "0" in the illustrative embodiment, the program advances to a step S38. In the step S38, the controller 62 increments the pulse counter 88 by 1. Subsequently, the controller 62 compares a count represented by the output data of the pulse counter 88 and a count represented by the read position count data output from the register 61 (step S39). If the two counts are coincident (YES, step S39), the controller 62 outputs the coincidence signal (IRQ="1") (step S40), and then decrements the repetition counter by 1 (step S41). If the answer of the step S39 is NO, the controller 62 directly executes the step S41.

Although not shown in FIG. 11, when the repetition counter 87 receives the repetition data load signal from the register 61, it sets the repetition number data output from the register 61. When the constant-speed flag of the controller 62 is set to "1", the output signal of the AND gate 90 turns from "0" to "1" and thereby enables the counter 87. As a result, the counter 87 sequentially decrements in response to the synchronizing pulses fed from the motor counter 85.

The controller 62 determines whether or not the repetition counter 87 is "1" (step S42). If the answer of the step S42 is NO, the controller 62 returns to the step S31. If the answer of the step S42 is YES, the controller 62 determines whether or not to change the deceleration pulse rate data, i.e., whether or not to replace the acceleration/deceleration pulse rate data with the exclusive deceleration pulse rate data (step S43). This can be done on the basis of the presence/absence of the deceleration data change signal. If the answer of the step S43 is YES, the controller 62 executes a step S45; if otherwise, it conditions the address counter for the down mode (step S44). In the step S45, the controller 62 resets the preload flag (PRFLG) to "0". Then, the controller 62 sets the slue-down flag to "1" (step S46), resets the pulse counter 88 to "0" (step S47), and then returns to the step S31.

On the other hand, if the count of the repetition counter 87 is "0" (YES, step S34), the controller 62 determines whether or not the motor counter 85 has generated a synchronizing pulse (MCLK) (MCLK="1") (step S48). If the answer of the step S48 is YES, the controller 62 generates the constant-speed end interrupt signal (step S49) and resets the constant-speed flag to "0" (step S50).

Figures 12, 12A:
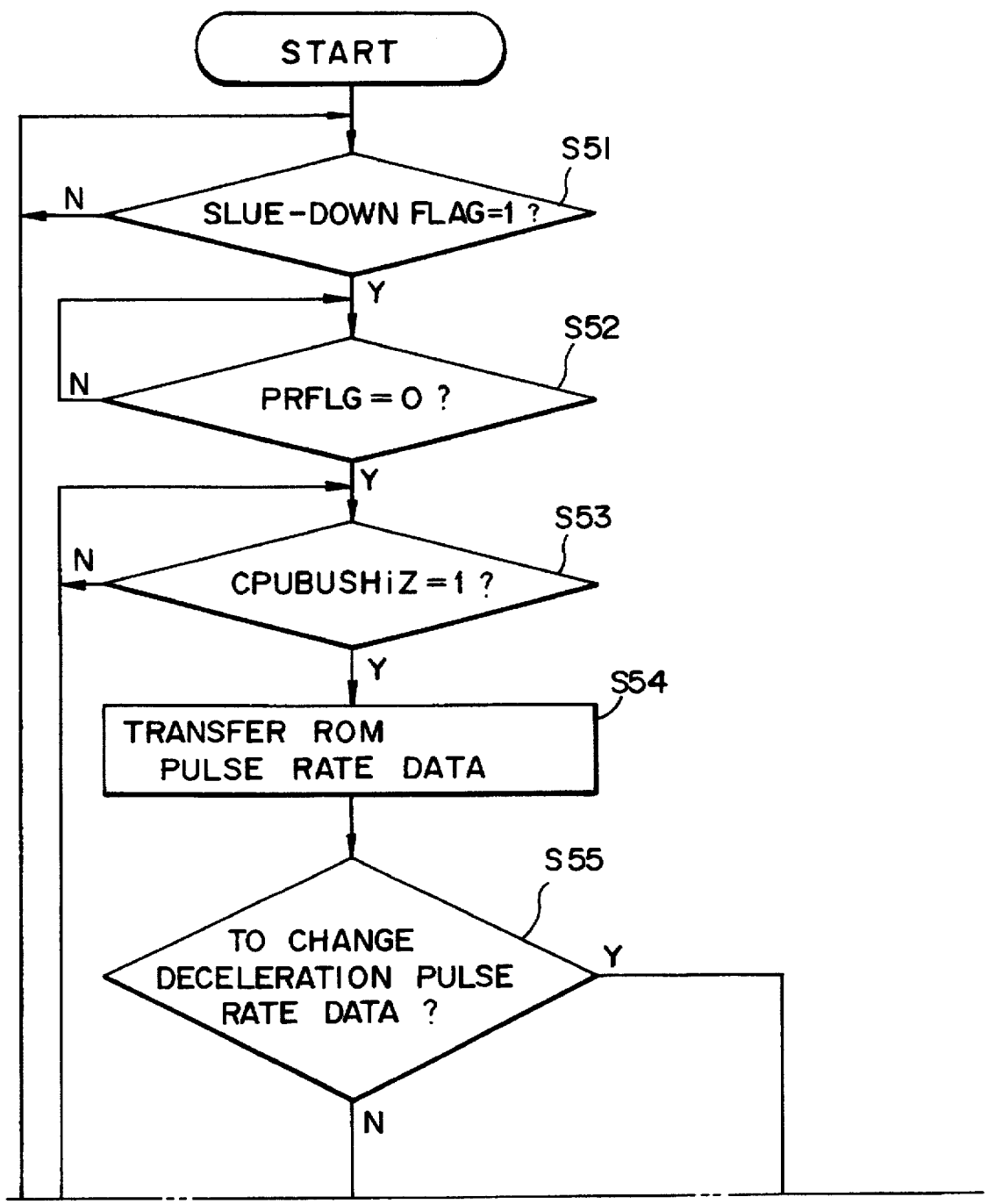
FIGS. 12A and 12B are a flowchart showing a part of slue-down processing shown in FIG. 8.
Figure 12B:
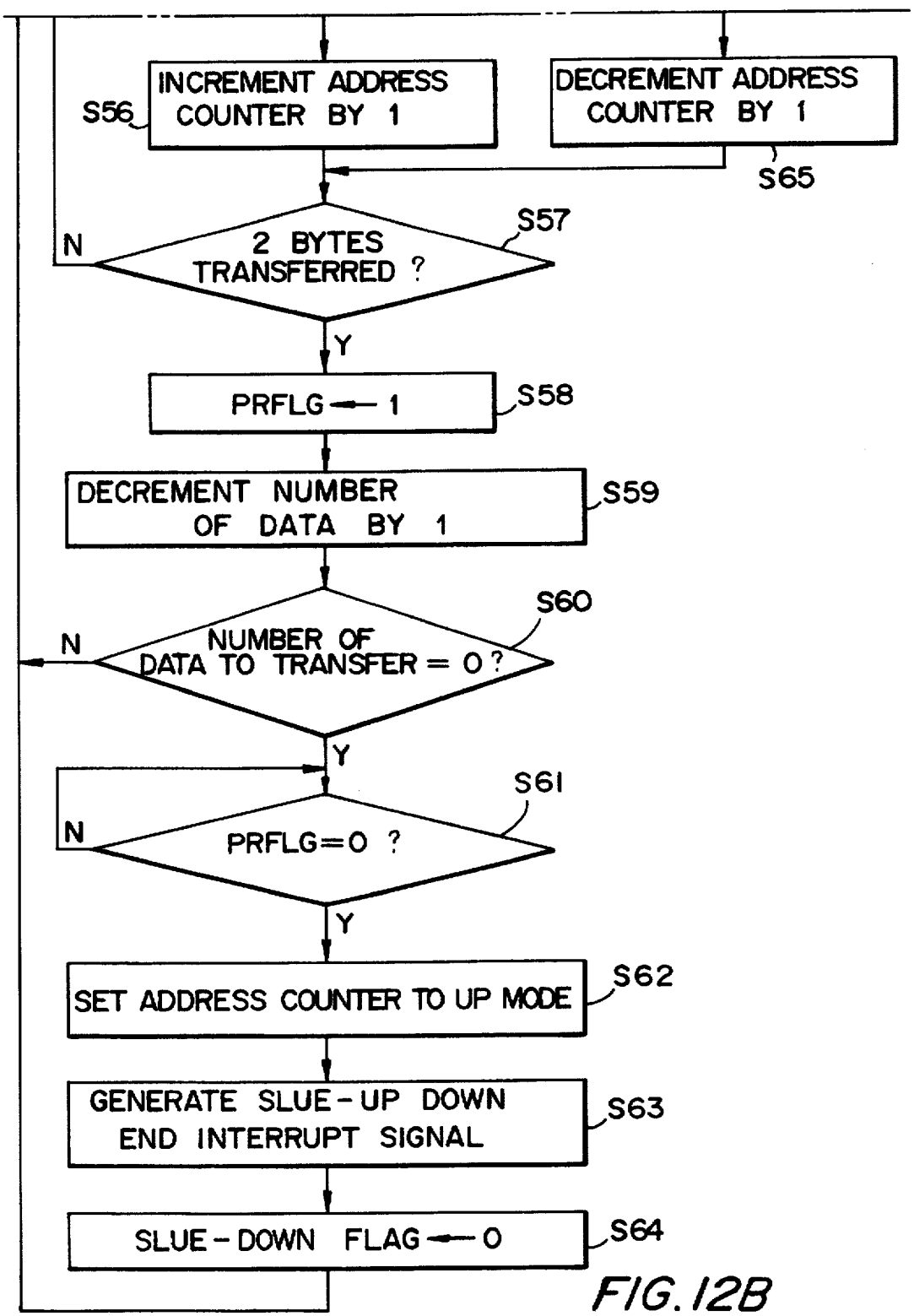

FIGS. 12 and 13 demonstrate the slue-down processing of FIG. 8 specifically. The procedures shown in FIGS. 12 and 13 start up independently of each other.

In FIG. 12, the controller 62 determines whether or not the slue-down flag is "1" (step S51) and determines, if it is "1", whether or not the preload flag (PRFLG) is "0" (step S52). If the answer of the step S52 is YES, the controller 62 determines whether or not the CPU 42 is not using the bus (CPUBUSHiZ="1") (step S53). If the CPU 41 is not using the bus, the controller 62 transfers, among the acceleration/deceleration pulse rate data (or deceleration pulse rate data) stored in the ROM 42, the pulse rate data of the address designated by the ROM address counter (initially the start address) to the pulse generator 63 (step S54). Subsequently, the controller 62 determines whether or not to change the acceleration pulse rate data, i.e., whether or not to replace the acceleration/deceleration pulse rate data with the exclusive deceleration pulse rate data on the basis of the presence/absence of the deceleration data change signal (step S55). If the answer of the step S55 is YES, the controller 62 increments the ROM address counter by 1 (step S65); if otherwise, it decrements the counter by 1 (step S56).

Thereafter, the controller 62 determines whether or not two bytes of acceleration/deceleration pulse rate data (deceleration pulse rate data) have been transferred (step S57). If the answer of the step S57 is NO, the controller 62 returns to the step S53. If the answer of the step S57 is YES, the controller 62 sets the preload flag (PRFLG) to "1" (step S58) and then decrements the number of acceleration/deceleration pulse rate data (deceleration pulse rate data) to be transferred (step S59). The controller 62 determines whether or not the number of acceleration/deceleration pulse rate data (or deceleration pulse rate data) to be transferred is "0" (step S60). If the answer of the step S60 is NO, the controller 62 returns to the step S51; if otherwise, it determines whether or not the preload flag (PRFLG) is "0" (step S61). If the answer of the step S61 is YES, the controller 62 restores the ROM address counter to the up mode, generates the slue-down end interrupt signal (step S63), and then resets the slue-down flag to "0" (step S64).

In FIG. 13, the controller 62 determines whether or not the count of the repetition counter 87 is "0" (step S71) and determines, if it is "0", whether or not the slue-down flag is "1" (step S72). If the answer of the step S72 is YES, the controller 62 determines whether or not the motor counter 85 has generated a synchronizing pulse (MCLK) (MCLK= "1") (step S73). If the answer of the step S73 is YES, the controller 62 sets the acceleration/deceleration pulse rate data (or the exclusive deceleration pulse rate data) received from the preload register 84 in the motor counter 85 (step S74), resets the preload flag (PRFLG) to "0" (step S75), and then returns to the step S71. When the slue-down flag is "0", the controller resets the count enable signal (STMST) to thereby disable the motor counter 85 (step S76).

The CPU 41 shown in FIG. 2 executes either polling processing or interrupt processing. During polling processing, the CPU 41 periodically determines whether or not the coincidence signal is input from the motor controller 45. When the coincidence signal is input, the CPU 41 determines that the number of steps of the motor 51 has reached the preselected number (arrival of the carriage 5 at the reading position), and causes the carriage 5 to start reading the document. During interrupt processing, the CPU 41 forcibly interrupts processing under way on receiving the coincidence signal. Then, the CPU 41 causes the carriage 5 to start reading the document, determining that the motor 51 has reached the preselected number of steps.

As stated above, when the constant-speed 1 signal and constant-speed 2 signal in the motor controller 45 are set to "0", the controller 45 repeatedly loads the pulse rate data (control data) assigned to the constant-speed drive of the motor 51 a preset number of times. As a result, the motor 51 is rotated at a constant speed. This allows the carriage 5 to run at a constant speed at least during the image reading period, thereby insuring stable copies.

If desired, the motor controller 45 shown in FIG. 3 may be used to control the main motor for driving the various rollers used to convey papers. In this case, the CPU 41 sets the constant-speed repeat 1 signal to "1" and causes the selector 64 to select the the repeat 1 signal in response to the constant-speed repeat select signal. In this condition, the constant-repeat signal input to the pulse generator 63 remains to be "0" at all times. Consequently, the repetition counter 87, FIG. 5, is disabled and cannot decrement, as shown in FIG. 11.

"2" may be set in the repetition counter 87 as the repetition number data beforehand, in which case the constant-speed repeat 1 signal will be set to "0" at a predetermined timing in a repeat copy mode (when two more papers to be fed are left). Then, it is possible to execute the slue-down processing shown in FIGS. 12 and 13 after the constant-speed operation shown in FIG. 11. The motor controller 45 can see the above timing because it receives information representative of the number of papers to be continuously fed and input on the operation panel 41 via the CPU 41. Therefore, images can be surely formed on a plurality of consecutive papers without regard to the maximum count available with the repetition counter 87.

Further, the motor controller 45 may be used to control a main motor installed in a laser printer or similar page printer for driving payer conveyor rollers. In this case, a printer controller (external unit), for example, sets the constant-speed repeat 2 signal in the motor controller 45 to "1" and causes the selector 64 to select the repeat 2 signal in response to the constant-speed repeat select signal. In this condition, the constant-repeat signal input to the pulse generator 63 remains to be "0" at all times. Consequently, the repetition counter 87, FIG. 5, is disabled and cannot decrement, as shown in FIG. 11.

A CPU included in an engine driver may set "2" in the repetition counter 87 as the repetition number data beforehand, in which case the constant-speed repeat 2 signal will be set to "0" at a predetermined timing in a repeat copy mode (when two more papers to be fed are left). Then, it is possible to execute the slue-down processing shown in FIGS. 12 and 13 after the constant-speed operation shown in FIG. 11. The printer controller transforms text code data received from a host computer to graphic data in the form of a bit map. Only if an image memory capable of storing at least three pages of such graphic data is provided, the printer controller can see the above timing by detecting two pages of graphic data left in the image memory alone. Therefore, images can be surely formed on a plurality of consecutive papers without regard to the maximum count available with the repetition counter 87.

"2" set in the repetition counter 87 as stated above is only illustrative. How many times the constant-speed processing (step S31-S37) should be repeated after the constant-speed repeat 1 or 2 signal has been changed to "0", but before deceleration processing, can be easily controlled on the basis of the value to be set in the counter 87.

If the motor controller 45 is implemented as a part of a control LSI (Large Scale Integrated circuit) installed in the copier or the page printer, it can be reduced in size and cost.

In the illustrative embodiment, the motor controller 45 is provided with the selector 64 for selecting either the repeat 1 signal output from the CPU 41 or the repeat 2 signal input from an external device, and feeding it to the pulse generator 63. However, the selector 64 is omissible if an arrangement is so made as to input one of the above two signals directly to the pulse generator 63.

While the present invention has been shown and described in relation to a digital copier or a page printer, it is similarly applicable to a facsimile apparatus including a stepping motor or similar electronic apparatus including an image forming device.

In summary, it will be seen that the present invention provides a stepping motor control device capable of surely controlling a stepping motor or drive source included in an electronic apparatus without increasing the load on a microprocessor.

Various modifications will become possible for those skilled in the art after receiving the teachings of the present disclosure without departing from the scope thereof.

What is claimed is:

1. A control device for controlling drive of a stepping motor which drives a movable portion of an electronic apparatus and is totally controlled by a microprocessor, said control device comprising:

motor drive means for driving the stepping motor;

store means for storing control data for acceleration, constant-speed drive and deceleration of the stepping motor; and motor control means for controlling the stepping motor via said motor drive means with said control data loaded without the intermediary of the microprocessor;

said motor control means comprising:

first constant-speed rotation control means for repeatedly loading the control data assigned to the constant-speed drive a preselected number of times to thereby rotate the stepping motor at a constant speed;

second constant-speed rotation control means for repeatedly loading said control data assigned to the constant-speed drive until a constant-speed rotation end signal arrives to thereby rotate the stepping motor at the constant speed; and constant-speed control selecting means for selecting one of said first and second constant-speed rotation control means at a time.

2. A control device as claimed in claim 1, wherein said constant-speed rotation end signal is input from the microprocessor.

3. A control device as claimed in claim 1, wherein said constant-speed rotation end signal is input from an external unit.

4. A control device as claimed in claim 1, wherein said motor control means comprises signal selecting means for selecting said constant-speed rotation end signal output from one of the microprocessor and an external unit, and wherein said second constant-speed rotation control means repeatedly loads said control data assigned to the constant-speed drive until said constant-speed rotation end signal selected by said signal selecting means arrives.

5. A control device as claimed in claim 1, wherein said motor control means forms a part of a control LSI installed in the electronic apparatus.

6. An electronic apparatus including a movable portion, comprising:

a stepping motor for driving the movable portion; and a control device for controlling drive of said stepping motor;

said control device comprising:

motor drive means for driving the stepping motor;

store means for storing control data for acceleration, constant-speed drive and deceleration of the stepping motor; and motor control means for controlling the stepping motor via said motor drive means with said control data loaded without the intermediary of a microprocessor;

said motor control means comprising:

first constant-speed rotation control means for repeatedly loading the control data assigned to the constant-speed drive a preselected number of times to thereby rotate the stepping motor at a constant speed; and second constant-speed rotation control means for repeatedly loading said control data assigned to the constant-speed drive until a constant-speed rotation end signal arrives to thereby rotate the stepping motor at the constant speed; and constant-speed control selecting means for selecting one of said first and second constant-speed rotation control means at a time.

* * * * *